(12) United States Patent
Nishide et al.

(10) Patent No.: US 7,995,238 B2
(45) Date of Patent: Aug. 9, 2011

(54) IMAGE PROCESSING THAT CAN USE BOTH PROCESS AND SPOT COLOR PLATES

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1105 days.

(21) Appl. No.: 11/044,345

(22) Filed: Jan. 28, 2005

(65) Prior Publication Data
US 2005/0243374 A1 Nov. 3, 2005

(30) Foreign Application Priority Data
Jan. 30, 2004 (JP) ................................. 2004-023706

(51) Int. Cl.
*H04N 1/60* (2006.01)
*G06K 15/00* (2006.01)
(52) U.S. Cl. ........... 358/1.9; 358/518; 358/515; 358/2.1
(58) Field of Classification Search ............... 358/1.9, 358/2.1, 1.11, 1.18, 504, 518, 448, 453, 462, 358/1.1, 1.2, 2.99, 3.27, 500, 501, 515, 516, 358/517, 519, 523, 524, 527, 530, 537, 538, 358/540; 382/162, 163, 165, 167, 166, 164; 347/5, 24, 115, 172; 399/1, 6, 39
See application file for complete search history.

(56) References Cited

U.S. PATENT DOCUMENTS

| | | | | |
|---|---|---|---|---|
| 5,724,441 A * | 3/1998 | Yoshida | ........................ | 382/166 |
| 6,049,390 A * | 4/2000 | Notredame et al. | .......... | 358/1.15 |
| 6,295,133 B1 * | 9/2001 | Bloomquist et al. | ........... | 358/1.1 |
| 6,320,667 B1 | 11/2001 | Mitsuhashi | | |
| 6,389,163 B1 * | 5/2002 | Jodoin et al. | .................. | 382/173 |
| 6,594,030 B1 * | 7/2003 | Ahlstrom et al. | ............ | 358/1.15 |
| 6,950,209 B1 * | 9/2005 | Das | .............................. | 358/3.01 |
| 7,375,857 B1 * | 5/2008 | Pinard et al. | ................. | 358/3.21 |
| 2002/0067509 A1 * | 6/2002 | Roylance | ....................... | 358/2.1 |
| 2002/0196465 A1 * | 12/2002 | Ohta | ........................... | 358/1.16 |

(Continued)

FOREIGN PATENT DOCUMENTS

| | | |
|---|---|---|
| EP | 0 705 024 | 4/1996 |
| JP | 06-320802 | 11/1994 |
| JP | 08-102845 | 4/1996 |

(Continued)

OTHER PUBLICATIONS

Office Action issued in JP Application No. 2005-019624 on Oct. 12, 2010 (with English translation).

*Primary Examiner* — Dov Popovici
(74) *Attorney, Agent, or Firm* — Oliff & Berridge, PLC

(57) ABSTRACT

The present invention provides an image processing method and an image processing apparatus. The method and the apparatus perform image processing based on image data and drawing commands input from an image processing terminal. The method includes: setting drawing of a spot color plate different from process colors when data of color plates of process colors is generated based on a drawing command; performing for each object drawing command replacement of drawing the spot color plate according to object information data of image processing settings according to the type of the object; and enabling image processing for each object with respect to the color plates of the process colors based on the object information of the spot color plate.

41 Claims, 21 Drawing Sheets

U.S. PATENT DOCUMENTS

| | | | |
|---|---|---|---|
| 2003/0179396 A1* | 9/2003 | Ishizuka et al. | 358/1.9 |
| 2004/0080765 A1* | 4/2004 | Nishide et al. | 358/1.9 |
| 2005/0206922 A1* | 9/2005 | Une | 358/1.9 |
| 2008/0013134 A1* | 1/2008 | Nishide et al. | 358/518 |
| 2009/0268251 A1* | 10/2009 | Nishide | 358/2.1 |
| 2010/0080582 A1* | 4/2010 | Sato et al. | 399/39 |

FOREIGN PATENT DOCUMENTS

| | | |
|---|---|---|
| JP | A 10-051653 | 2/1998 |
| JP | 10-240477 | 9/1998 |
| JP | A 2001-358954 | 12/2001 |
| JP | 2003-067149 | 3/2003 |

\* cited by examiner

<</Separations true /SeparationColorNames[/Cyan/Magenta/Yellow/Black/TAG]>>
setpagedevice

```
. . . . . . .
newpath             %CLEAR FIGURE
00 moveto           %MOVE TO (0,0)
10 lineto           %DRAW LINE FROM (0,0) TO (1,0)
11 lineto           %DRAW LINE FROM (1,0) TO (1,1)
01 lineto           %DRAW LINE FROM (1,1) TO (0,1)
0001 setcmykcolor   %DESIGNATE DRAWING COLOR (BLACK)
fill                %FILL CONSTRUCTED FIGURE
. . . . . . .
```

FIG. 8A

```
. . . . . . . . .
newpath        %CLEAR FIGURE
0 0 moveto     %MOVE TO (0,0)
1 0 lineto     %DRAW LINE FROM (0,0) TO (1,0)
1 1 lineto     %DRAW LINE FROM (1,0) TO (1,1)
0 1 lineto     %DRAW LINE FROM (1,1) TO (0,1)
0 0 0 1 setcmykcolor    %DESIGNATE DRAWING COLOR (BLACK)
gsave          %STORE GRAPHIC STATE (DEFINED AS A)
gsave          %STORE GRAPHIC STATE (DEFINED AS B)
fill           %FILL CONSTRUCTED FIGURE
grestore       %RESTORE GRAPHIC STATE (RESTORE TO B)
true setoverprint      %SET OVERPRINT
[/Separation (TAG)/DeviceGray {}] setcolorspace %SET SPOT COLOR
1 setcolor    %SET VALUE OF OBJECT INFORMATION
{pop 1} settransfer    %SET TRANSFER CURVE (CHANGE TO WHITE)
fill           %FILL FIGURE ON SPOT COLOR PLATE
grestore1      %RESTORE GRAPHIC STATE OTHER THAN COORDINATE POSITION (RESTORE TO A)
. . . . . . . . .
```

FIG. 8B

```
. . . . . . . . .
newpath        %CLEAR FIGURE
0 0 moveto     %MOVE TO (0,0)
1 0 lineto     %DRAW LINE FROM (0,0) TO (1,0)
1 1 lineto     %DRAW LINE FROM (1,0) TO (1,1)
0 1 lineto     %DRAW LINE FROM (1,1) TO (0,1)
0 0 0 1 setcmykcolor    %DESIGNATE DRAWING COLOR (BLACK)
currentoverprint false setoverprint %TURN OFF SETTING OF OVERPRINT
fill           %DRAW ON PROCESS PLATE IN KNOCKOUT
setoverprint   %RESTORE OVERPRINT
. . . . . . . . .
```

```
newpath      %CLEAR FIGURE
0 0 moveto   %MOVE TO (0,0)
1 0 lineto   %DRAW LINE FROM (0,0) TO (1,0)
1 1 lineto   %DRAW LINE FROM (1,0) TO (1,1)
0 1 lineto   %DRAW LINE FROM (1,1) TO (0,1)
0 0 0 1 setcmykcolor    %DESIGNATE DRAWING COLOR (BLACK)
gsave        %STORE GRAPHIC STATE (DEFINED AS A)
gsave        %STORE GRAPHIC STATE (DEFINED AS B)
fill         %FILL CONSTRUCTED FIGURE
grestore     %RESTORE GRAPHIC STATE (RESTORE TO B)
true setoverprint       %SET OVERPRINT
[/Separation (TAG)/DeviceGray {}] setcolorspace  % SET SPOT COLOR
1 setcolor       %SET VALUE OF OBJECT INFORMATION
fill         %FILL FIGURE ON THE SPOT COLOR PLATE
grestore1    %RESTORE GRAPHIC STATE OTHER THAN COORDINATE POSITION (RESTORE TO A)
```

```
newpath      %CLEAR FIGURE
0 0 moveto   %MOVE TO (0,0)
1 0 lineto   %DRAW LINE FROM (0,0) TO (1,0)
1 1 lineto   %DRAW LINE FROM (1,0) TO (1,1)
0 1 lineto   %DRAW LINE FROM (1,1) TO (0,1)
0 0 0 1 setcmykcolor    %DESIGNATE DRAWING COLOR (BLACK)
currentcolor 1   %SET PROCESS COLORS AND SPOT COLOR
[/DeviceN [(Cyan) (Magenta) (Yellow) (Black) (TAG)] /DeviceGray
{pop pop pop}] setcolorspace
fill
```

. . . . . . . .
```
00 moveto    %MOVE TO (0,0)
/Ryumin-Light-RKSJ-H findfont 48 scalefont setfont
                             %SET FONT AND CHARACTER SIZE
0001 setcmykcolor      %DESIGNATE DRAWING COLOR (BLACK)
(ABCDE)    %INFORMATION OF CHARACTERS TO BE DRAWN
show       %DRAW CHARACTERS
```
. . . . . . . .

FIG. 10B

. . . . . . . .
```
00 moveto %MOVE TO (0,0)
/Ryumin-Light-RKSJ-H findfont 48 scalefont setfont
                             %SET FONT AND CHARACTER SIZE
0001 setcmykcolor      %DESIGNATE DRAWING COLOR (BLACK)
(ABCDE)    %INFORMATION OF CHARACTERS TO BE DRAWN
dup        %DUPLICATE INFORMATION OF CHARACTERS TO BE DRAWN
gsave      %STORE GRAPHIC STATE (DEFINED AS A)
show       %DRAW CHARACTERS
grestore   %RESTORE GRAPHIC STATE (RESTORE TO A)
gsave      %STORE GRAPHIC STATE (DEFINED AS B)
true setoverprint    %SET OVERPRINT
[/Separation (TAG)/DeviceGray {}] setcolorspace %SET SPOT COLOR
1 setcolor       %SET VALUE OF OBJECT INFORMATION
show       %DRAW CHARACTERS INFORMATION
grestore1        %RESTORE GRAPHIC STATE OTHER THAN COORDINATE POSITION (RESTORE TO A)
```
. . . . . . . .

/DeviceCMYK setcolorspace
<<
/ImageType 1
/Width 2
/Height 2
/ImageMatrix [2 0 0 2 0 0]
/BitsPerComponent 8
/Decode [0 1 0 1 0 1 0 1]
/DataSource { <A0FF0000A0FF0000 A0FF0000A0FF0000>} %PIXEL VALUE
>>
image
. . . . . . . .
```

. . . . . . . .
/DeviceCMYK setcolorspace                    F I G. 12A
<<
/ImageType 1
/Width 2
/Height 2
/ImageMatrix [2 0 0 2 0 0]
/BitsPerComponent 8
/Decode [0 1 0 1 0 1 0 1]
/DataSource { <A0FF0000A0FF0000 A0FF0000A0FF0000>} %PIXEL VALUE
>>
image
gsave       %STORE GRAPHIC STATE (DEFINED AS A)
true setoverprint       %SET OVERPRINT
[/Separation (TAG)/DeviceGray {}] setcolorspace %SET SPOT COLOR
1 setcolor        %SET VALUE OF OBJECT INFORMATION
{pop 1} settransfer    %SET TRANSFER CURVE (CHANGE TO WHITE)
0011 rectfill  %FILL IMAGE DRAWING REGION
grestore1     % RESTORE GRAPHIC STATE OTHER THAN COORDINATE POSITION(RESTORE TO A)
. . . . . . . .

. . . . . . . .
/DeviceCMYK setcolorspace                    F I G. 12B
<<
/ImageType 1
/Width 2
/Height 2
/ImageMatrix [2 0 0 2 0 0]
/BitsPerComponent 8
/Decode [0 1 0 1 0 1 0 1]
/DataSource { <A0FF0000A0FF0000 A0FF0000A0FF0000>} %PIXEL VALUE
>>
currentoverprint     %TURN OFF OVERPRINT IF SET
{
faise setoverprint
image
true setoverprint
{
image
} ifelse
. . . . . . .

/DeviceRGB setcolorspace
<<
/ImageType 1
/Width 2
/Height 2
/ImageMatrix [2 0 0 2 0 0]
/BitsPerComponent 8
/Decode [0 1 0 1 0 1]
/DataSource [ <A0FF00A0FF00 A0FF00A0FF00>] %PIXEL VALUE
>>
image

/DeviceRGB setcolorspace
<<
/ImageType 1
/Width 2
/Height 2
/ImageMatrix [2 0 0 2 0 0]
/BitsPerComponent 8
/Decode [0 1 0 1 0 1]
/DataSource [ <A0FF00A0FF00 A0FF00A0FF00>] %PIXEL VALUE
>>
image
gsave          %STORE GRAPHIC STATE (DEFINED AS A)
true setoverprint     %SET OVERPRINT
[/Separation (TAG)/DeviceGray {}] setcolorspace %SET SPOT COLOR
1 setcolor     %SET VALUE OF OBJECT INFORMATION
0011 rectfill  %FILL IMAGE DRAWING REGION
grestore1      %RESTORE GRAPHIC STATE OTHER THAN COORDINATE POSITION (RESTORE TO A)

. . . . .

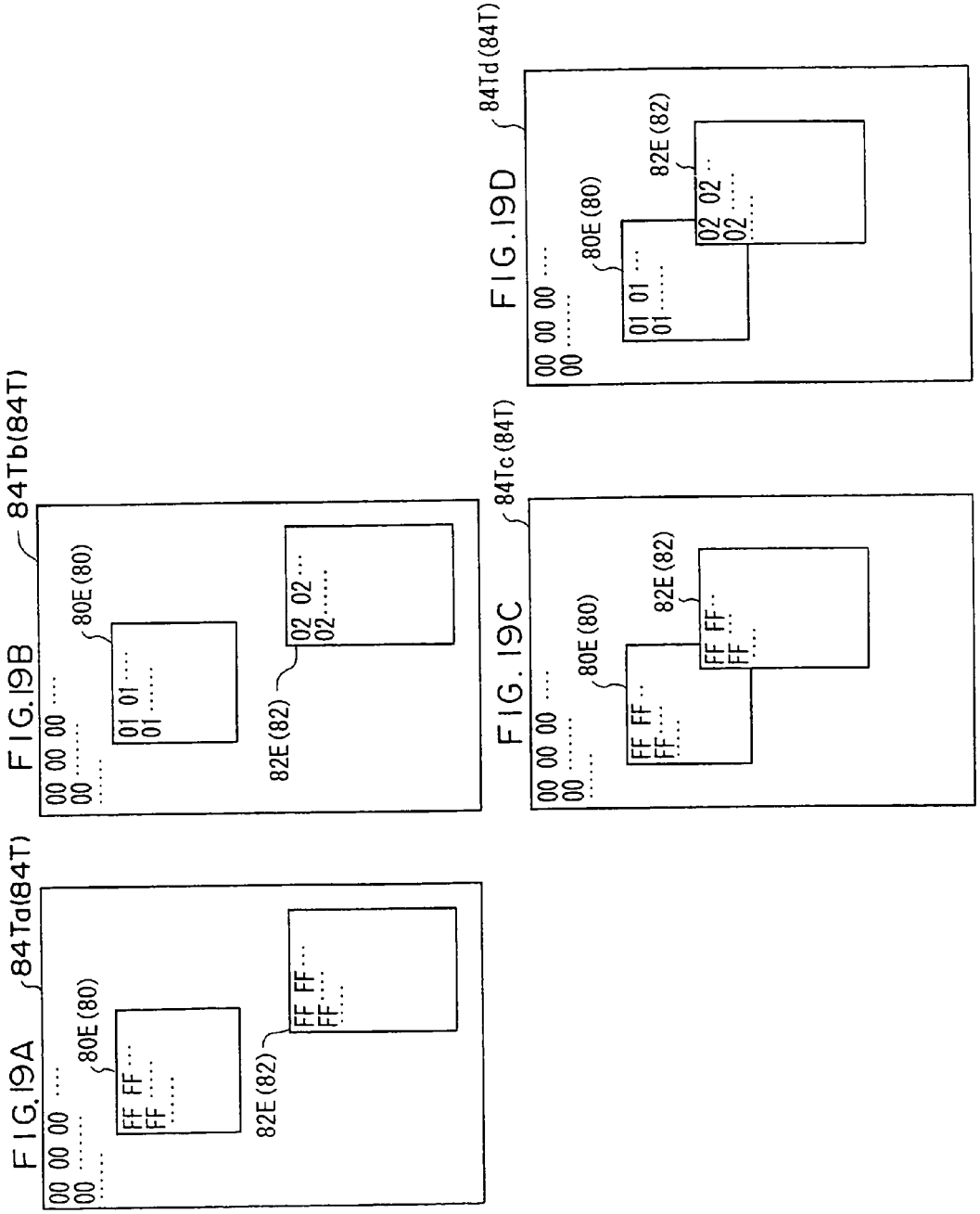

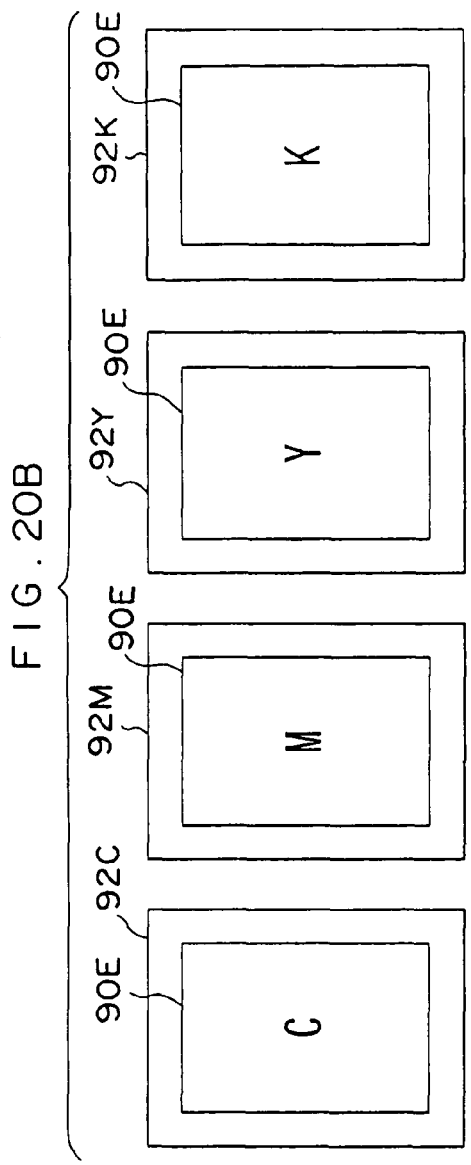
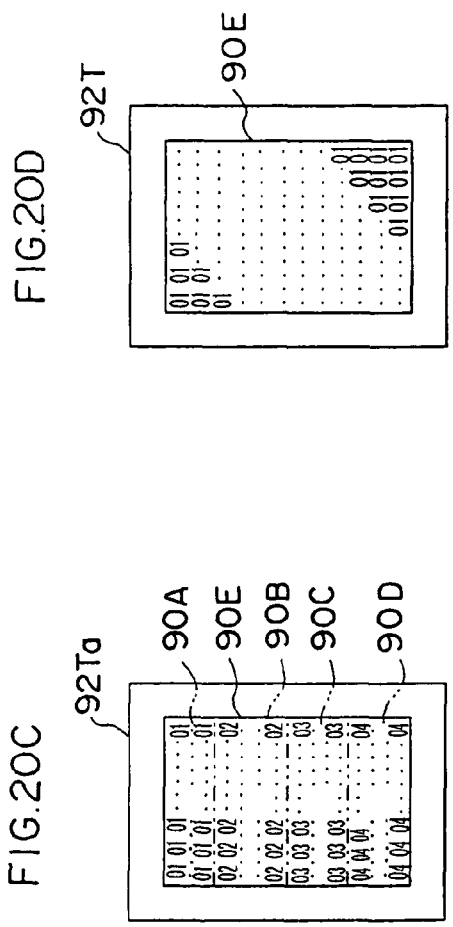
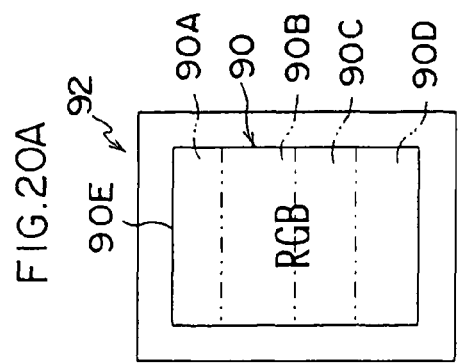

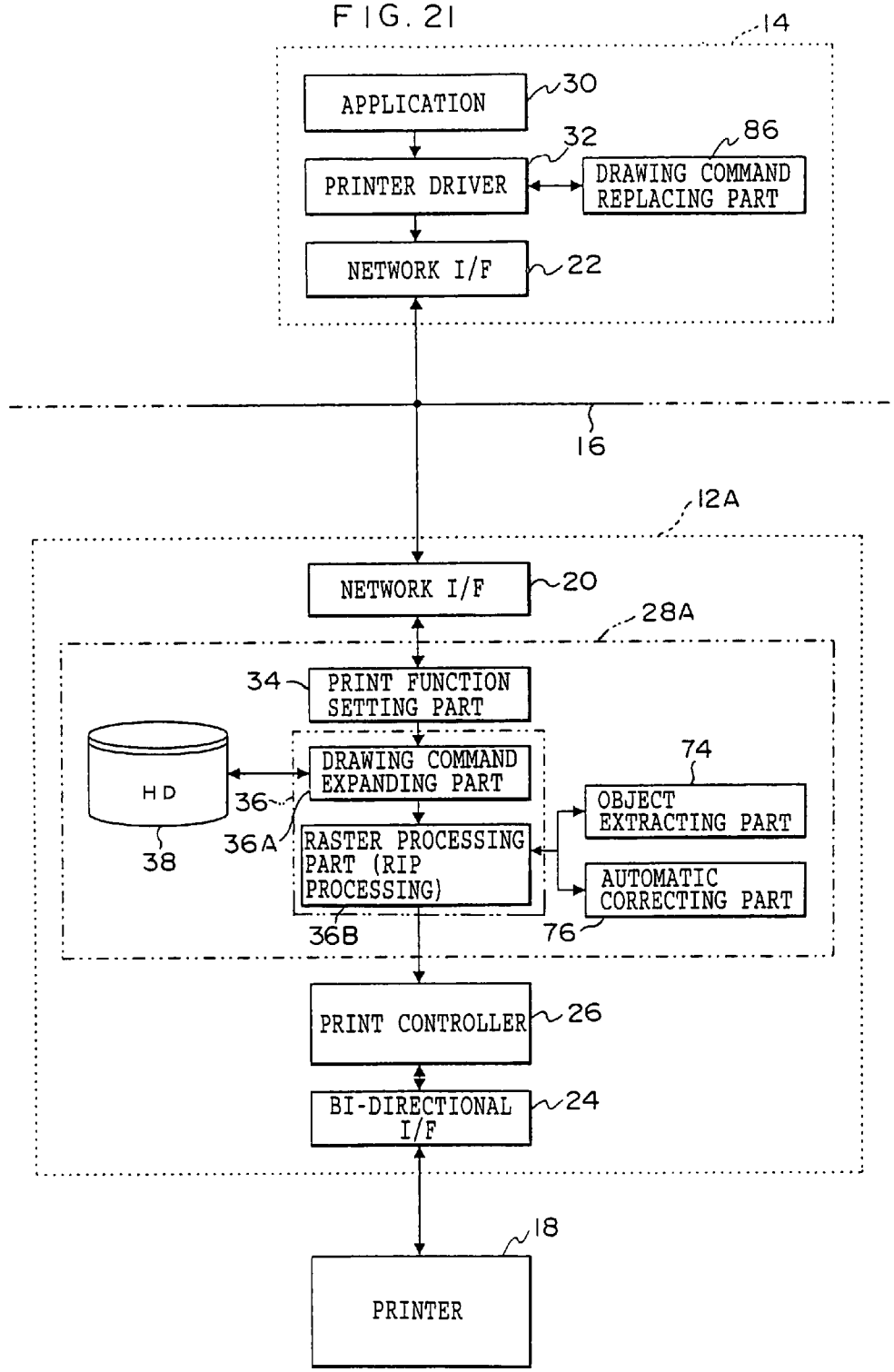

IMAGE PROCESSING THAT CAN USE BOTH PROCESS AND SPOT COLOR PLATES

CROSS-REFERENCE TO RELATED APPLICATION

This application claims priority under 35 USC 119 from Japanese Patent Application No. 2004-023706, the disclosure of which is incorporated by reference herein.

BACKGROUND OF THE INVENTION

1. Field of the Invention

The present invention relates to an image processing method and an image processing apparatus for performing image processing based on image data or drawing commands input from an image processing terminal.

2. Description of the Related Art

Recently, output devices such as color printers with high accuracy have become common and in the field of DTP that requires printing output with great accuracy, such output devices are used to, for example, to make proofs of page layouts and the like prepared through creation, editing and processing on image processing terminals such as personal computers, work stations and so on.

In such color printers, screen processing is performed for tone reproduction. By the screen processing, multi-valued data is converted into binary data, thereby obtaining printing output with gradation levels.

In screen processing, screen frequency is made to become relatively low (the number of screen lines is decreased) when an image is to be reproduced with smooth gradation by increasing the number of gradation levels. Screen frequency is made to become relatively high (the number of screen lines is increased) when thin-line reproducibility of intermediate gradation-levels is to be improved.

Also, in normal color printing, although process colors of C (cyan), M (magenta), Y (yellow) and K (black) are used, ink of a color (spot color) other than the process colors may be used. Further, a document including an image (object) using the process colors and an object using the spot color may be made.

When such a document is proofed by using a printer (color comprehensive layout output), a method is possible in which a spot color plate is generated in addition to color plates for each of the process colors, and therefore, in the case of a document using spot color, proper color comprehensive output can be easily obtained.

Generally, the number of screen lines is switched for each document. Recently, however, processing has been performed in which, on a single page layout, for objects such as characters the thin-line reproducibility is improved by increasing the number of screen lines (raising screen frequency), and for objects such as photos smooth gradation is maintained by decreasing the number of screen lines (lowering screen frequency).

In addition, to improve color reproducibility of each object in a printout, there is a proposal that color is changed for each object, such as characters and pictures, and the color processing most suitable to each object is performed to print out the result.

In a color printer, in order to make print output close to that displayed on a display, color correction processing is generally carried out. In this color correction, the color value of each pixel is adjusted based on adjustment amounts specific to each printer.

The images printed out on color printers include photographic image data taken with digital cameras, and photograph image data read in from negatives, such as by film scans.

In digital cameras and the film scans if analog signals corresponding to the photographic images are formed into image data by digital processing, and then image data like this is simply displayed on a display as it is, then the quality of the image can be inappropriate and an oddness in the colors and the like can develop.

Because of this, there are proposals to correct imbalances and standardize abnormal distributions (removing bias) to provide image data of preferable image quality. Here, for example, photographic image data that has been obtained by digital processing would be analyzed for characteristic values of image brightness and contrast, color balance and the like. When there is bias in the characteristic values when the digital data is obtained (e.g. at the time of photographing) and it is determined that these are adverse then these would be subjected to correction processing by using a prescribed LUT.

However, because in a color printer color correction is made for each pixel, correction based on the characteristic values of photographic images as a whole becomes difficult.

Also, in applications for making page layouts, when photographic images and the like are subject to PDL conversion then image data can be broken up into arbitrarily sized portions. Because of this, at the time of printing out, if adjustments to the brightness, contrast, color balance and the like are made based on analysis of characteristic values for each broken up portion of image data, then rather than improving the quality of the finished photographic image output it can actually make it worse.

Because of this, in order to avoid such a problem of mismatches in the finished photographic images printed out, there is a proposal to carry out the correction processing for one page of data all at a single time.

However, in expanding the drawing command, if a flag is set so as to carry out color processing that varies by pixel, to do this it is essential to change critical parts of an image processing apparatus including a drawing command expanding part, a part writing to the image memory and the like. For this reason, it means there is a need to change critical parts and make extensive changes to a normal image processing apparatus, thereby leading to substantial development costs, and so such an image processing apparatus cannot be easily obtained.

Also, when there are several photographic images, not all of the characteristic values of the photographic images will be the same, and because of this, deteriorating image quality can occur, and even the deterioration of the quality of all of the images on a given page can occur.

SUMMARY OF THE INVENTION

The present invention has been made in view of the above circumstances and provides an image processing method and an image processing apparatus.

According to a first aspect of the present invention, is provided an image processing method that performs image processing based on image data and drawing commands input from an image processing terminal. The method comprises: setting drawing of a spot color plate different from process colors when data of color plates of process colors is generated based on a drawing command; performing for each object drawing command replacement of drawing the spot color plate according to object information data of image processing setting according to the type of the object; and enabling image processing for each object with respect to the color plates of the process colors based on the object information of the spot color plate.

By this invention, by using the function of drawing a spot color plate provided in an image processing apparatus, drawing with object information for setting the processing of each image object. Here, drawing command replacement is carried out to set the image processing by the drawing command of each object.

By doing this, the color plates for the process colors and the color plate for the spot color can be formed when drawing command expansion is carried out. Here, the spot color plate is formed with the object information, which shows the processing for each object and each pixel, and so the image processing is made switchable based on this object information.

According to a second aspect of the invention, is provided an image processing apparatus for performing image processing based on drawing commands input from an image processing terminal. The apparatus comprises: a drawing command replacing part that sets drawing of a spot color plate different from process colors when data of color plates of process colors is generated based on a drawing command, and that performs drawing command replacement of drawing the spot color plate according to data of object information for image processing setting according to the type of object for each object; and a drawing command expanding part that expands the drawing command replaced in the drawing command replacing part and generates color plates of the process colors and the spot color plate.

By this invention, a spot color plate can be formed in addition to each of the process color plates. By carrying out drawing command replacement the spot color plate can be drawn according to the set screen line number for each object or each pixel, based on the drawing commands.

In this way, without replacing major units and making extensive modifications to a standard image processing apparatus, it becomes possible to simply undertake image processing, such as screen line number switching, which is specific to each object.

Also, it becomes possible to form high quality photographic images, by undertaking the appropriate color correction processing of photographic images.

BRIEF DESCRIPTION OF THE DRAWINGS

Embodiments of the present invention will be described in detail on the following figures, wherein:

FIG. 7A is a schematic view showing an example of a drawing command for generating a spot color plate;

FIG. 7B is a schematic view showing an example of a drawing command for drawing a figure;

FIGS. 8A and 8B are schematic views showing examples of drawing command replacement with respect to FIG. 7B;

FIGS. 9A and 9B are schematic views showing another examples of drawing command replacement with respect to FIG. 7B;

FIG. 10A is a schematic view showing an example of a drawing command for drawing characters;

FIG. 10B is a schematic view showing an example of drawing command replacement with respect to FIG. 10A;

FIG. 11 is a schematic view showing an example of a drawing command for drawing an image;

FIGS. 12A and 12B are schematic views showing examples of drawing command replacement with respect to FIG. 11;

FIG. 17A is a schematic view of an example of a drawing command for drawing a photographic image;

FIG. 17B is a schematic view of an example of drawing command replacement for the drawing command of FIG. 17A;

FIG. 19A to FIG. 19D are schematic views showing examples of the object information on a spot color plate;

FIG. 20A is a schematic view showing an example of a page layout of a RGB image;

FIG. 20B is a schematic view showing the RGB image of FIG. 20A when the image date is separated into the process color plates;

FIG. 20C is a schematic view showing an example of a spot color plate when the data of the RGB image of FIG. 20A has been divided up into several blocks;

FIG. 20D is a schematic view showing an example of a spot color plate of the RGB image which has been divided up into several blocks as a single image;

FIG. 21 is a schematic configuration view showing another configuration of a print server and client terminal in accordance with the second embodiment of the invention.

DETAILED DESCRIPTION OF THE INVENTION

Embodiments of the invention will be described below referring to appended figures.

First Embodiment

Figure 1:
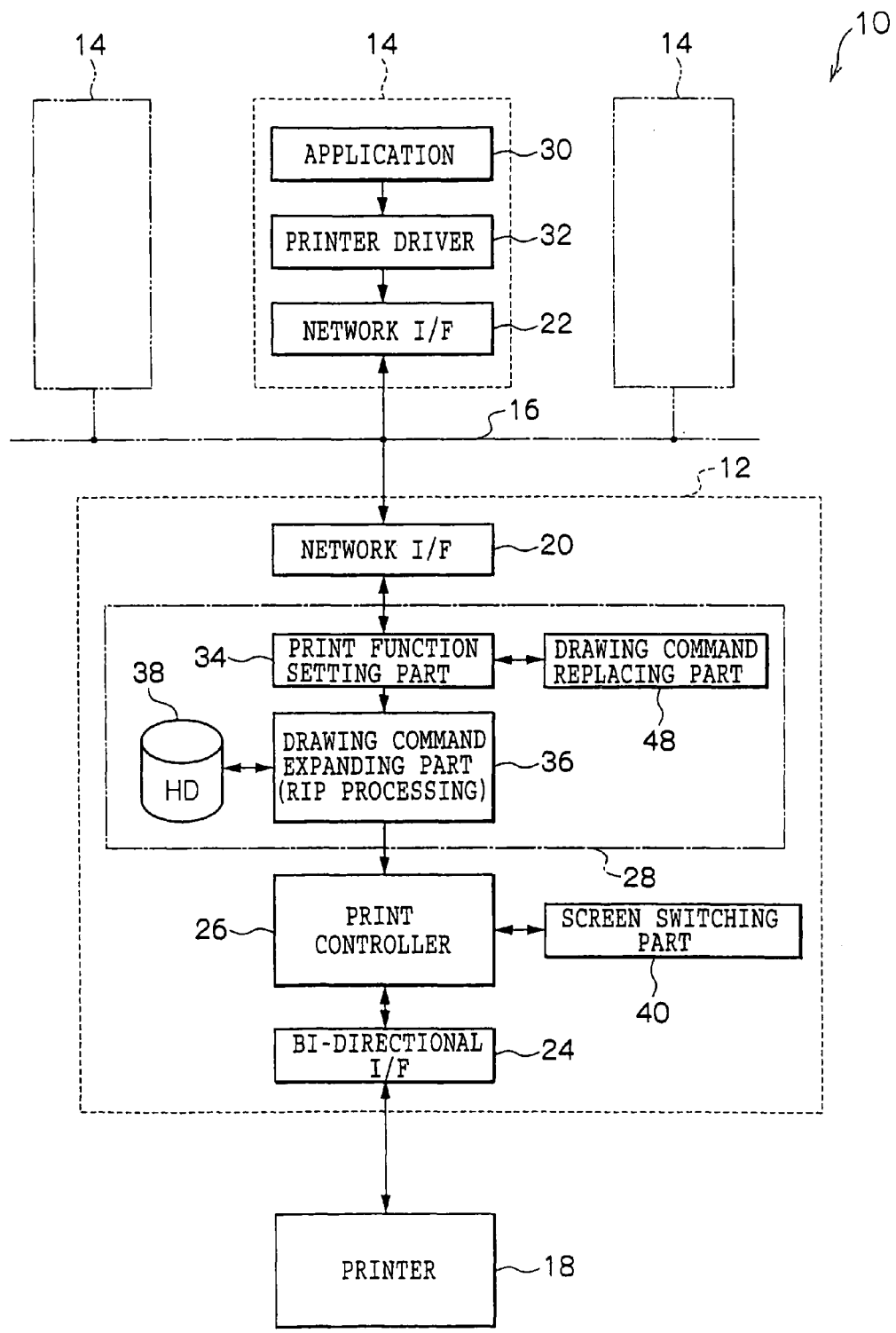
FIG. 1 is a schematic configuration view of a print server and client terminals in accordance with a first embodiment of the present invention.

FIG. 1 shows a schematic configuration of a network 10 in accordance with this embodiment. In the network 10, a print server (image processing apparatus) 12 and a plurality of client terminals (image processing terminals) 14 are connected to each other via a communication line 16.

A printer (printout device) 18 is connected to the print server 12. When the print server 12 receives a print job output from the client terminal 14, printout is carried out according to the print job. Although the image processing apparatus is used as a print server in this embodiment, the image processing apparatus of the invention is not limited to this and may be provided with various intermediate servers such as file servers connected to the client terminals 14 in a network and performing image processing.

Network interfaces (network I/F) 20 and 22 are provided in the print server 12 and the client terminals 14, respectively, each of which is connected to the communication line 16 via the network interfaces 20 and 22. The print server 12 has a bi-directional interface (bi-directional I/F) 24 and is connected to the printer 18 via the bi-directional I/F 24. The printer 18 connected to the print server 12 may be single or plural and the bi-directional I/F 24 may be also plural or plural types of interfaces.

The print server 12 can be configured by adding a PCI board with a predetermined function to a personal computer (PC). The print server 12 has input devices including a keyboard and a mouse, and a display device including a CRT display, and a LCD display. The print server 12 may further have a WYSIWYG function for printing out an image displayed on the display device and processing a displayed image.

The print server 12 is provided with a print controller 26 for controlling the printer 18 and an image processing part 28. In the print server 12, when job data such as image data and picture data is input as a print job from the client terminal 14, Raster Image Processing (RIP) for generating raster data on the job data is performed in the image processing part 28.

The print server 12: stores the input print jobs in a process waiting queue; reads out the print jobs stored in the process waiting queue in sequence; perform image processing (RIP processing); stores data to be output to the printer 18 after image processing (raster data) in a print waiting queue; and outputs the data from the print waiting queue to the printer 18 in sequence. The print server 12 is generally configured so as to store and hold a job in which print processing is not designated or cannot be performed in a holding queue. The print server 12 may have various conventional and well-known configurations and therefore further description thereof is omitted.

Meanwhile, the client terminal 14 has various applications 30 and carries out image processing including the creation, processing and editing of images and document processing by using the applications 30.

The client terminal 14 is also provided with a printer driver 32 and transmits prepared image data or picture data and various processing commands as a print job to the print server 12 via the printer driver 32. The print server 12 performs designated image processing for the print job and outputs the processed data to the printer 18. This enables obtaining printed matter according to the print job.

A print function setting part 34 is formed in the image processing part 28 of the print server 12. When the print function setting part 34 receives a job such as a print job, the print function setting part 34 set various print functions designated by the printer driver 32 and so on in the print job. In the print server 12, wide variety of conventional and known print functions can be set and the print function setting part 34 determines the print functions designated in the print job and sets each of the print functions to be executed. Detailed description thereof is omitted in this embodiment.

The image processing part 28 is provided with a drawing command expanding part 36 and a Hard Disk (HD) 38 for storing various data therein. The image processing part 28 performs image processing on the drawing command expanding part 36 according to the print job input from the client terminal 14. At this time, image processing and RIP processing are performed based on print functions set in the print function setting part 34.

The image processing part 28 generates raster data of each color of C, M, Y and K (C plate, M plate, Y plate and K plate) for each page of the print job by performing RIP processing. By outputting the raster data to the printer 18 through the print controller 26, a color image in which images of the C plate, M plate, Y plate and K plate are superimposed on a recording paper is formed in the printer 18.

The printer 18 can perform screen processing, that is screen processing, in a photo mode emphasizing gradation levels and in a character mode emphasizing thin-lines.

As described later, whether or not screen processing is performed and which mode is used in screen processing is set by using a user interface (UI) provided in the printer driver 32 on the client terminal 14.

The print server 12 is provided with a screen switching part 40. The screen switching part 40 switches the number of lines (screen frequency) during screen processing and sets the information in the printer 18. Since basic configuration of screen processing can utilize conventional and known configurations, further description thereof is omitted.

Figure 2:
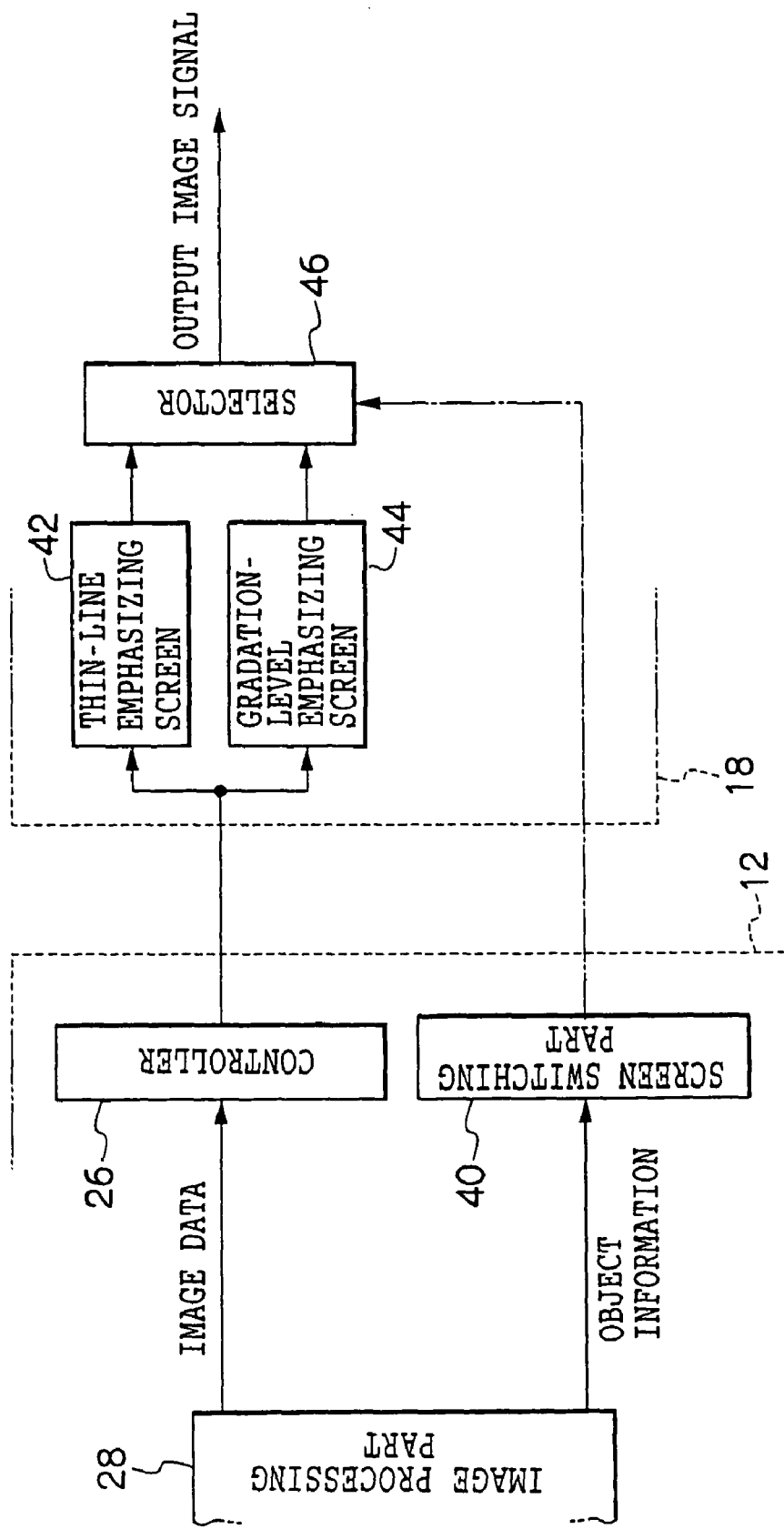
FIG. 2 is a schematic configuration view showing screen processing.

As shown in FIG. 2, the printer 18 is provided with a thin-line emphasizing screen 42 and a gradation-level emphasizing screen 44. The image data (raster data) of each of colors C, M, Y and K that is generated in the image processing part 28 is input to the thin-line emphasizing screen 42 and the gradation-level emphasizing screen 44.

The printer 18 is also provided with a selector 46 and a signal is input from the screen switching part 40 to the selector 46. The selector 46 switches an output of the thin-line emphasizing screen 42 or an output of the gradation-level emphasizing screen 44 based on the switch signal sent from the screen switching part 40 and outputs an output image signal.

The printer 18 forms an image on a recording paper based on the output image signal. At this time, the screen switching part 40 outputs the switching signal for each object so that an object subjected to thin-line emphasizing screen processing and an object subjected to gradation-level emphasizing screen processing can be formed in a mixed manner together in the layout of a single page.

The printer 18 is provided with a triangular wave generator. The triangular wave generator generates a triangular wave of screen frequency for thin-line emphasis and a triangular wave of screen frequency for gradation-level emphasis. The triangular wave of screen frequency for thin-line emphasis is input to the thin-line emphasizing screen 42 and the triangular wave of screen frequency for gradation-level emphasis is input to the gradation-level emphasizing screen 44.

Each of the thin-line emphasizing screen 42 and the gradation-level emphasizing screen 44 performs screen processing by using these triangular waves.

The screen frequency for thin-line emphasis becomes higher than the screen frequency for gradation-level emphasis. For example, the gradation-level emphasizing triangular wave has one cycle per three pixels and the thin-line emphasizing triangular wave has one cycle per two pixels. That is, the thin-line emphasizing screen 42 has a high number of lines and the gradation-level emphasizing screen 44 has a low number of lines.

Accordingly, reproducibility of characters is improved by performing screen processing in the thin-line emphasizing screen 42 and reproducibility of gradation-levels is improved by performing screen processing in the gradation-level emphasizing screen 44.

In the print server 12, screen processing with a low number of lines using the gradation-level emphasizing screen 44 is performed by setting the screen mode to screen processing in the photo mode and screen processing with a high number of lines using the thin-line emphasizing screen 42 is performed by setting the screen mode to screen processing in the character mode.

As shown in FIG. 1, the image processing part 28 of the print server 12 is provided with a drawing command replacing part 48. When the drawing command replacing part 48 receives input of a print job in which there is character/photo mode is set for screen processing, combining the photo mode and the character mode, the drawing command replacing part 48 substitutes drawing commands of the print job with drawing commands setting the photo mode and the character mode for each object. The drawing command expanding part 36 performs RIP processing based on the replaced drawing commands.

Figure 3:
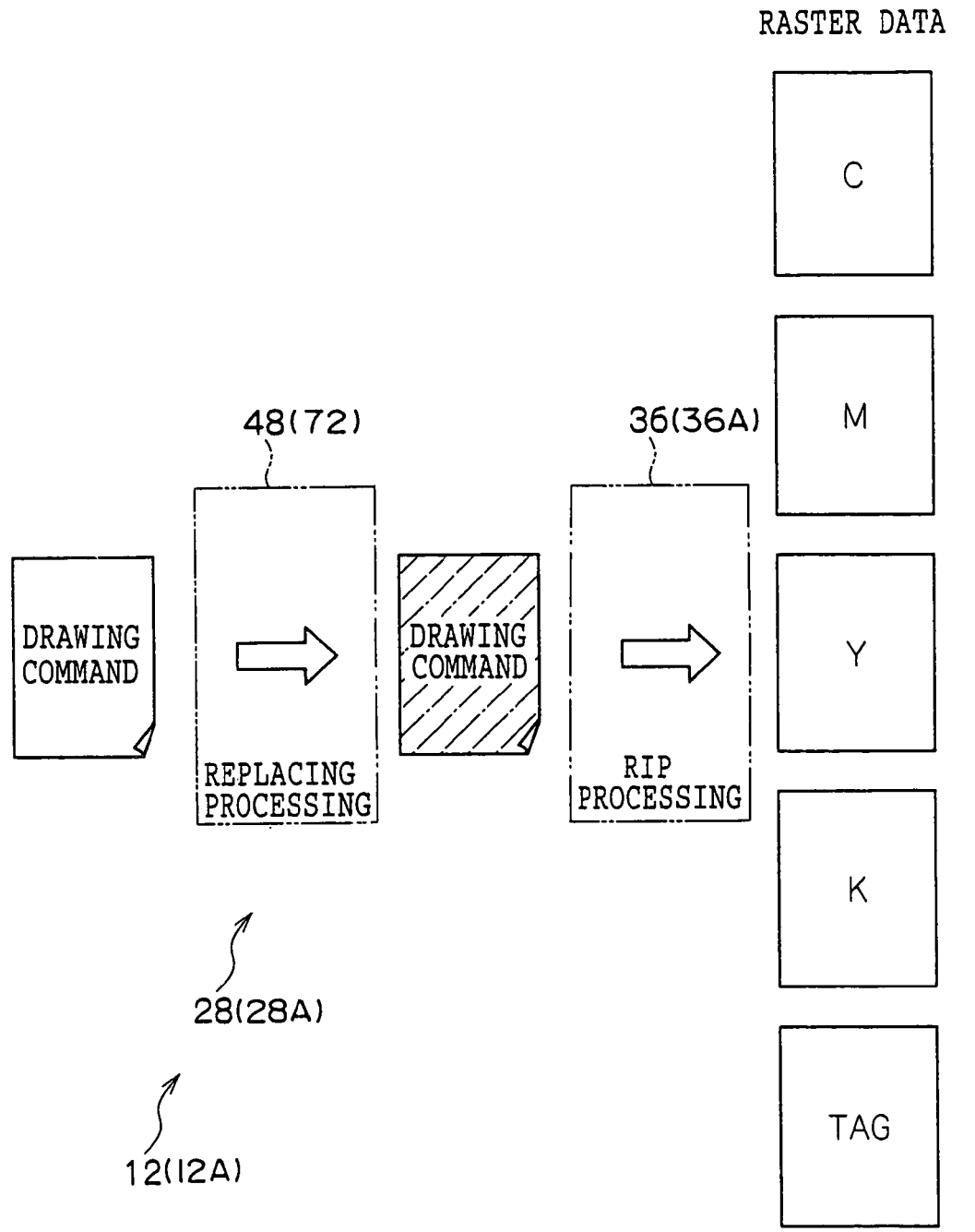
FIG. 3 is a schematic configuration view showing flow of processing of an image processing part of the print server.

That is, as shown in FIG. 3, in the drawing command replacing part 48 of the print server 12, predetermined replacing processing is performed with respect to drawing commands for each drawing command. The drawing command expanding part 36 performs RIP processing based on the drawing command replaced in the drawing command replacing part 48.

The RIP processing in the drawing command expanding part 36 generates raster data of each of colors C, M, Y and K (each color plate). The raster data is multi-valued data for each pixel and is output as image data to the printer 18.

The drawing command replacing part 48 creates the drawing command so as to generate each color plate of process colors (C, M, Y and K) as well as a plate for spot color other than the process colors (hereinafter referred to as "spot color plate").

The drawing command expanding part 36 generates raster data based on the setting information on the spot color plate for performing screen processing as to whether the photo mode or the character mode is to be used for each object.

That is, for the data on object information of each pixel, the drawing command is replaced, so that the spot color plate as a flag of the photo mode/character mode is generated as the object information.

Accordingly, the drawing command expanding part 36 generates the spot color plate (TAG) as the object information in addition to each color plate of C, M, Y and K.

As shown in FIG. 2, in the screen switching part 40, when the object information (spot color plate) is input a switching signal based on the object information is output to the selector 46 in sync with output of the image data. Accordingly, the thin-line emphasizing screen 42 and the gradation-level emphasizing screen 46 are switched for each object or pixel to output an output image signal. That is, the output signal (output image signal) from the thin-line emphasizing screen 42 and the gradation-level emphasizing screen 46 is switched and output.

As an effect of this embodiment, processing in the print server 12 will be described below. When the print server 12 receives the job (print job) output from the client terminal 14, the print function setting part 34 reads and sets print functions. Subsequently, the print server 12 performs image processing, RIP processing and print processing based on the set print functions.

The printer 18 can perform screen processing. In the case where screen processing is set in the print job output from the client terminal 14, the printer 18 performs screen processing by receiving screen setting based on the setting from the print server 12.

Meanwhile, the client terminal 14 carries out processing including creation, processing and editing by using the applications 30 and creates a document and so on in which characters and images as objects are arranged on the page layout. The page layout and the like are output as the print job to the print server 12 through the printer driver 32.

At this time, arrangement of each object on the page layout is designated by the drawing command.

Moreover, by using the user interface (UI) set in the printer driver 32, various functions can be set and the printer driver 32 can set screen processing.

Figure 4:
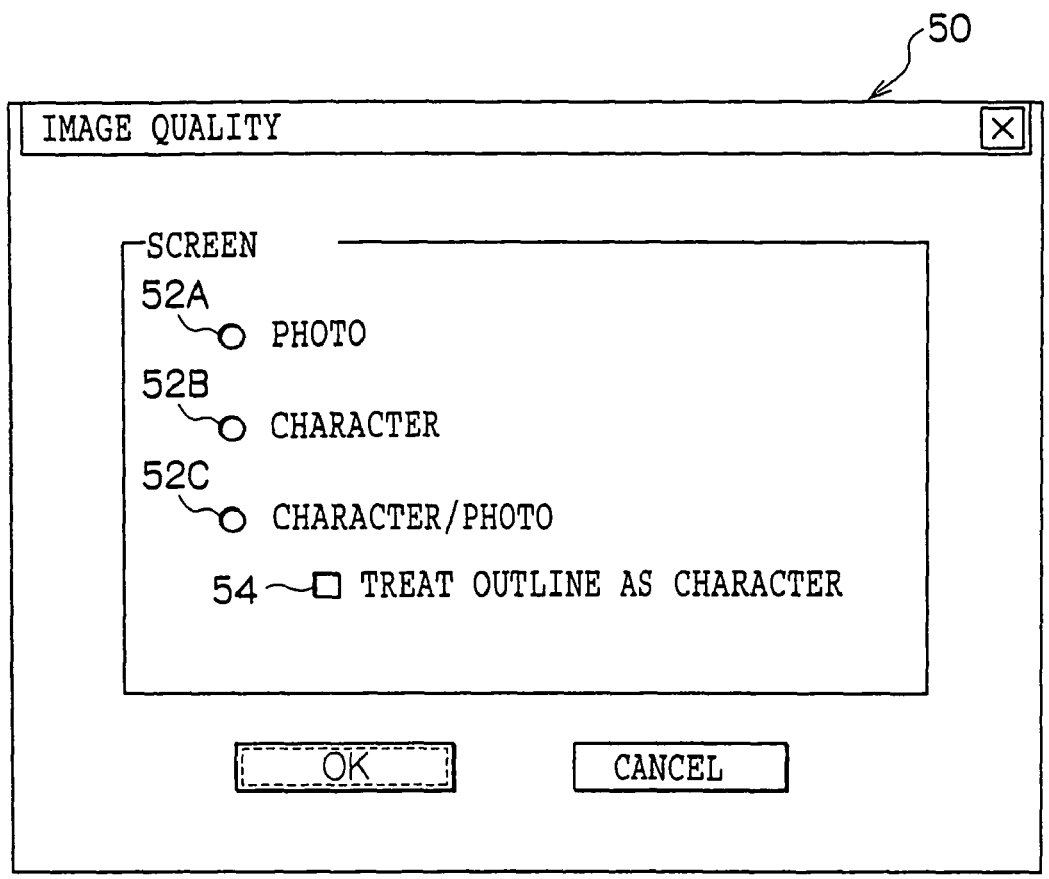
FIG. 4 is a schematic view of a setting dialogue, which is an example of a user interface for setting screen processing.

FIG. 4 shows a setting dialogue 50, which is an example of the user interface used for setting screen processing on the client terminal 14. The setting dialogue 50 is displayed on a monitor of the client terminal 14, for example, by selecting setting of screen processing (herein referred to as "image quality" setting) with print processing being designated.

In the setting dialogue 50, it is possible to select either the "photo mode" emphasizing gradation-levels as the screen mode or the "character mode" emphasizing thin line as the screen mode. Further, in the setting dialogue 50, it is also possible to select the "photo/character mode" as a mix mode. The user interface, used for setting screen processing and screen mode, is not limited to the setting dialogue 50 and any configuration can be applied. Although the client terminal 14 carries out selection and setting in this embodiment, the print server 12 may carry out selection and setting.

Radio boxes 52A, 52B and 52C are installed in the setting dialogue 50. The photo mode is selected by checking the radio box 52A and the character mode is selected by checking the radio box 52B.

In the case where a screen mode is set by the client terminal 14, the print server 12 performs screen processing based on the set screen mode and forms an image subjected to screen processing on a recording paper.

In the setting dialogue 50, the photo/character mode is selected by checking the radio box 52C. When the photo/character mode is selected, a check box 54 can be checked and the outline of the object is set to be treated as character by checking the check box 54. This enables screen processing with a high number of lines with respect to the outline of graphics, thereby to achieve sharp-edged graphics.

By selecting the photo/character mode and setting screen processing, the print server 12 selects the photo mode or the character mode for each object, performs screen processing based on the screen mode set for each object and forms an image subjected to screen processing on a recording paper.

Figure 5:
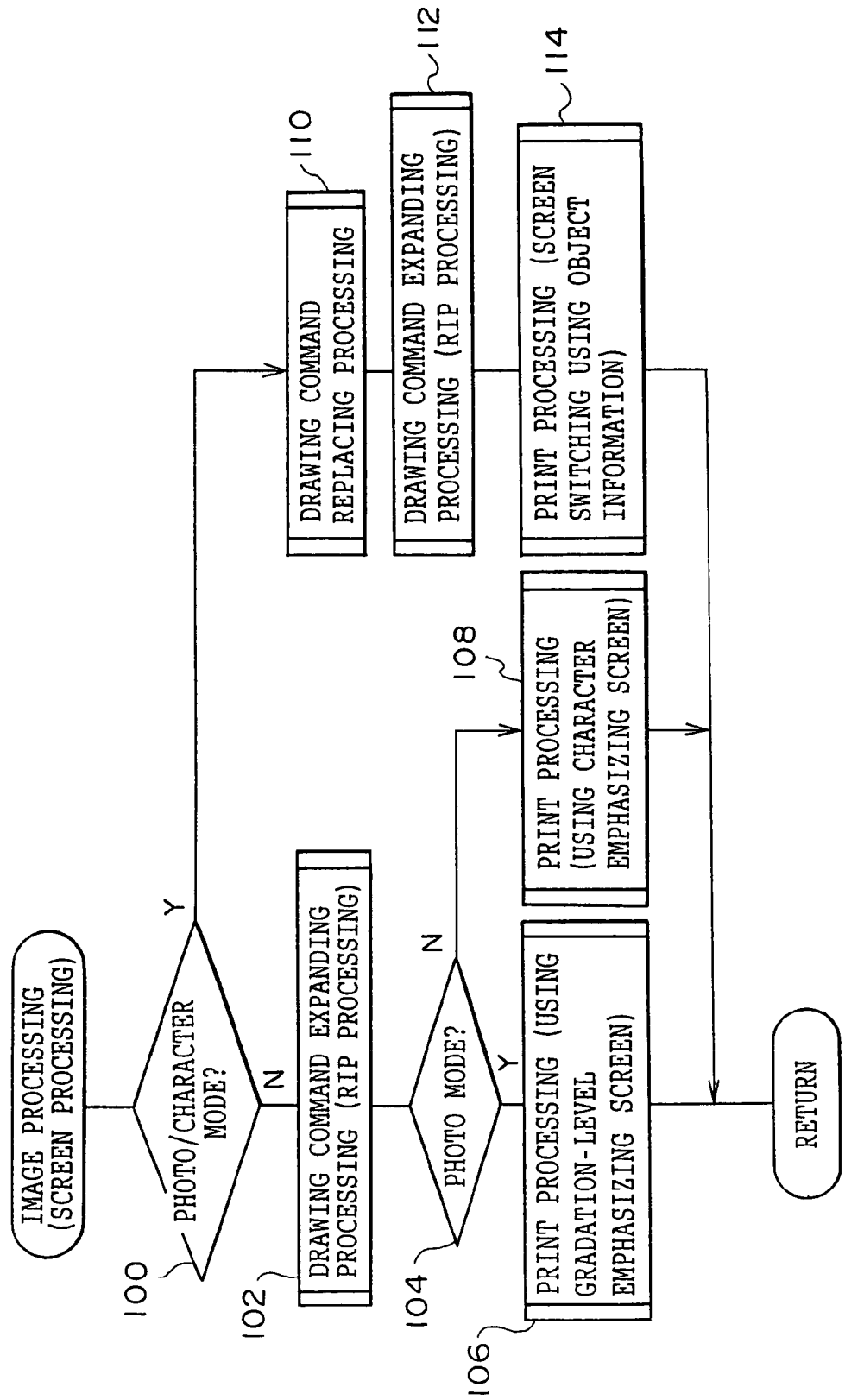
FIG. 5 is a flow chart showing an outline of screen processing in a print server.

FIG. 5 is an outline of image processing (print processing) in the print server 12 using the printer 18. This figure shows flow of processing in accordance with settings of screen processing.

This flow chart is executed when setting of print functions with respect to the received print job is completed. In an initial step 100, it is confirmed whether or not the screen mode is set at the photo/character mode. In the following description, it is assumed that screen processing is set.

In the case where the screen mode is set at the photo mode or the character mode instead of the photo/character mode, it is determined that the screen mode is not set at the photo/character mode and the operation proceeds to step 102. In step 102, drawing command expanding processing is performed and raster data is generated (RIP processing).

In next step 104, it is confirmed whether or not the screen mode is set at the photo mode, that is, which of the photo mode or the character mode is set.

In the case where the screen mode is set at the photo mode, it is determined that the screen mode is set at the photo mode in step 104 and the operation proceeds to step 106. Then, print processing is performed while screen processing is performed using the gradation-level emphasizing screen 44 that performs screen processing with a low number of lines (low screen frequency).

In the case where the screen mode is set at the character mode, it is determined that the screen mode is not set at the photo mode in step 104 and the operation proceeds to step 108. Then, print processing is performed while screen processing is performed using the character emphasizing screen 42 that performs screen processing with a high number of lines (high screen frequency).

In the case where the screen mode is set at the photo/character mode, it is determined that the screen mode is set at the photo/character mode in step 100 and the operation proceeds to step 110. In this step 110, an object is extracted based on the drawing command and it is set whether the extracted object is subjected to screen processing in the character mode or in the photo mode, that is, whether the extracted object is subjected to screen processing using the character emphasizing screen 42 or whether screen processing using the gradation-level emphasizing screen 44. At the same time, drawing command replacing processing is performed so that a drawing command of the spot color plate as the object information can be obtained.

Subsequently, the operation proceeds to step 112 and the spot color plate including the object information, in addition to raster data of each color plate of C, M, Y and K, is generated by performing drawing command expanding processing of the drawing command subjected to replacing processing.

In next step 114, an image subjected to screen processing is formed on the recording paper for each color plate of C, M, Y and K while switching between the character emphasizing screen 42 and the gradation-level emphasizing screen 44 for each object or pixel by using the spot color plate.

Here, replacing processing of the drawing command performed in step 110 will be described.

When drawing command replacing processing is performed, firstly, the drawing command shown in FIG. 7A, for example, is added so that the spot color plate, in addition to each color plate of C, M, Y and K, is generated. Hereinafter, the drawing command will be described by taking description in PostScript language as an example and comments (details of the description) are added at "%".

Subsequently, by performing drawing command replacement with respect to the drawing command for each object, raster data of each color plate of C, M, Y and K and raster data of the spot color plate (data of 0x00, 0xFF) are generated when the replaced drawing command is subjected to expanding processing.

The spot color plate at this time is made to become object information for each object (each pixel forming the object). The object information at this time represents the photo mode of the low number of lines or the character mode of the high number of lines.

For example, providing object information of the spot color plate is set as "0x00(white)" in the case of the low number of lines (photo mode) and set as "0xFF (black)" in the case of the high number of lines (character mode), screen processing of figures (drawing command is "fill") is performed with the low number of lines (using the gradation-level emphasizing screen 44) and characters (drawing command is "show") is performed with the high number of lines (using the character emphasizing screen 42). In this case, when expanding processing with respect to the replaced drawing command is performed, each color plate of C, M, Y and K, which are process colors based on the original drawing command, and the spot color plate (TAG) showing the object information are formed.

Objects include image, gradation, figure, character and line and a drawing command is set for each object. Table 1 shows types of objects and drawing commands of each object.

TABLE 1

| Types of objects and drawing commands | |
| --- | --- |
| Type | Example of command |
| Image | image |
| Gradation | shfill |
| Figure | fill |
| Character | show |
| Line | stroke |

Since the object is defined by the drawing command in this manner, it is possible to recognize which type of objects the corresponding object is on the basis of the drawing command. That is, based on the drawing command, it is possible to determined whether screen processing of the high number of lines using the character emphasizing screen 42 or screen processing of the low number of lines using the gradation-level emphasizing screen 44 is more preferable.

When screen processing is performed, the number of lines (screen) is previously set for each drawing command in the drawing command replacing part 48 provided with the print server 12.

Table 2 and Table 3 shows an example of the number of screen lines with respect to the drawing command.

TABLE 2

| Drawing command | Screen | Replacing code |
| --- | --- | --- |
| Image | Low no. of lines | Code generating object information 0x00 (replacing code of image) |
| Shfill | Low no. of lines | Code generating object information 0x00 |
| Fill | Low no. of lines | Code generating object information 0x00 (replacing code of fill) |
| Show | High no. of lines | Code generating object information 0xFF (replacing code of show) |
| Stroke | High no. of lines | Code generating object information 0xFF |

TABLE 3

| Drawing command | Screen | Replacing code |
| --- | --- | --- |
| Image | Low no. of lines | Code generating object information 0x00 (replacing code of image) |
| Shfill | Low no. of lines | Code generating object information 0x00 |
| Fill | High no. of lines | Code generating object information 0xFF (replacing code of fill) |
| Show | High no. of lines | Code generating object information 0xFF (replacing code of show) |
| Stroke | High no. of lines | Code generating object information 0xFF |

As shown in Table 2 and Table 3, preferably, it is set that screen processing with the low number of lines using the gradation-level emphasizing screen 44 is performed for image (image) and gradation (shfill) and screen processing with the high number of lines using the character emphasizing screen 42 is performed for character (show) and line (stroke). Further, both the low number of lines and the high number of lines may be set for figure (fill).

Hereinafter, an object that is set to be subjected to screen processing with the high number of lines is defined as a character-family object and an object that is set to be subjected to screen processing with the low number of lines is defined as an image-family object.

Either of the settings in Table 2 or Table 3 is stored in the drawing command replacing part 48. The drawing command replacing part 48 performs drawing command replacement so that the object corresponding to the drawing command is subjected to screen processing with the set screen (number of lines). The number of lines corresponding to the drawing command may be set on the print server 12 or may be set on the client terminal 14 and then stored in the print server 12.

Figure 6:
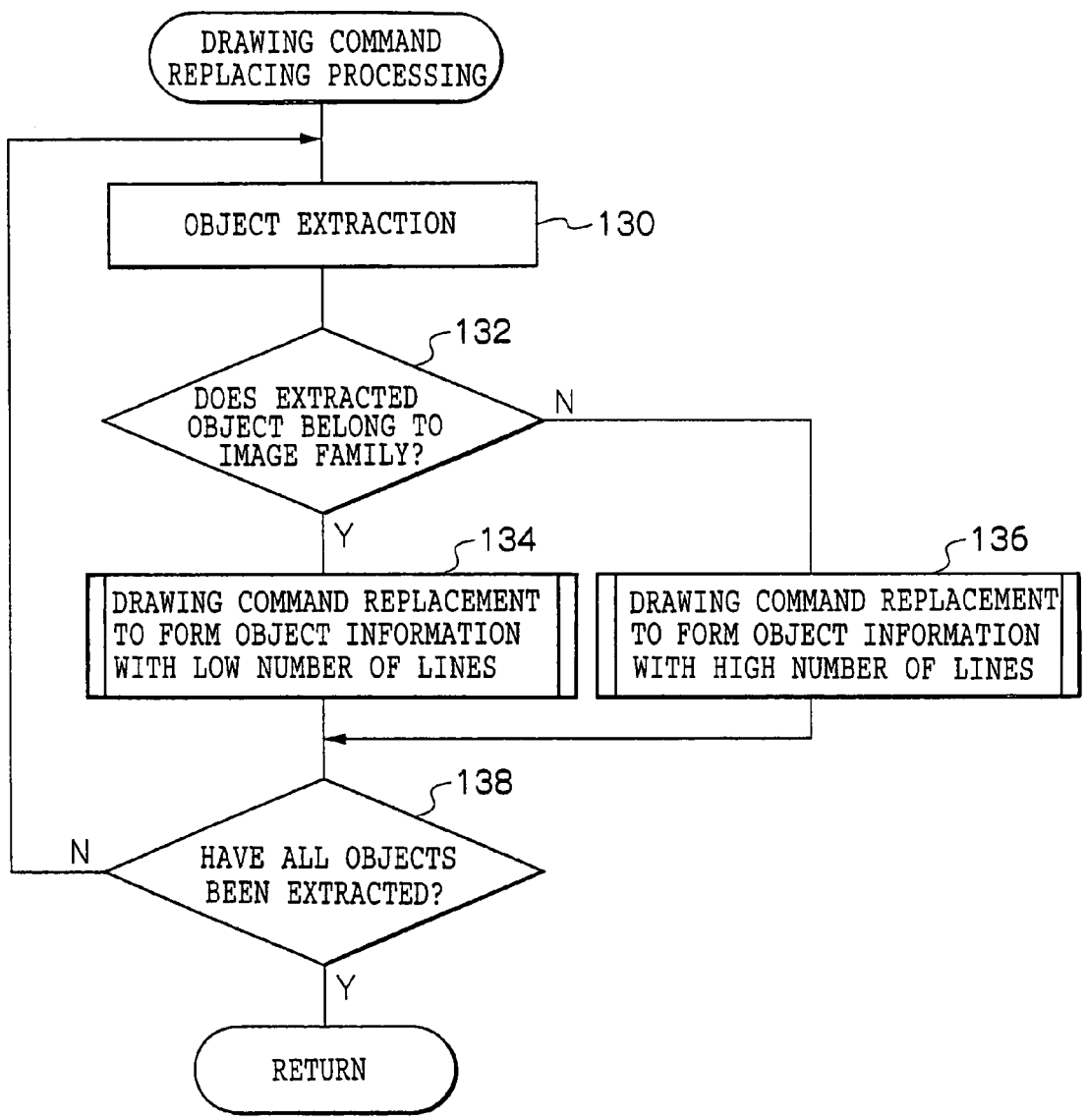
FIG. 6 is a flow chart of an outline of drawing command replacement.

FIG. 6 shows an outline of processing performed in step 110 of FIG. 5. In this flow chart, in an initial step 130, an object is extracted from a drawing command. After that, based on the drawing command of the extracted object, it is confirmed whether or not the object is an image-family object. That is, based on the drawing command, the extracted object is determined to be an object set as an image family or an object set as a character family.

Here, when the extracted object is an image-family object, it is determined that the extracted object belongs to the image family in step 132 and the operation proceeds to step 134. In step 134, drawing command replacement is performed to form the object information (for example, 0x00) with data on the spot color plate to subject the corresponding object (pixels forming the object) to screen processing with the low number of lines.

On the other hand, when the extracted object is a character-family object, it is determined that the extracted object does not belong to the image family in step 132 and the operation proceeds to step 136. In step 136, drawing command replacement is performed to form the object information (for example, 0xFF) with data on the spot color plate to subject the corresponding object (pixels forming the object) to screen processing with the high number of lines.

In this way, drawing command replacement is performed for all objects (affirmative determined that all objects are extracted is made in step 138).

Here, a specific example of drawing command replacement performed in step 134 or step 136 will be described.

FIG. 7B shows the drawing command (drawing command before replacement) for drawing a black square figure (drawing command is "fill") when the figure is defined as an image-family object.

To undertake drawing according to the above-mentioned drawing command (fill), when the spot color plate (object information) for replacing with the drawing command is set so as to perform screen processing with the low number of lines (photo mode) with respect to the object (figure) designated, the image is formed (drawn) using an overprint setting.

Use of the overprint setting prevents the image formed according to the original drawing command from being erased by the image corresponding to the object information formed on the spot color plate.

A method of replacing with the drawing command using a transfer function as well as overprint setting are applied to drawing command replacement. FIG. 8A shows an example of drawing command replacement using a transfer function (transfer curve). By writing 0x00 into the spot color plate together with using the transfer function, it is possible to overwrite the object information that has been already written into the spot color plate while keeping the image formed according to the original drawing command intact.

When the spot color plate is drawn, knockout setting of making an object region a non-image region can be used without using overprint setting. FIG. 8B shows an example of drawing command replacing processing using knockout setting. By turning overprint setting off and drawing, the spot color plate can obtain the same effect as overwriting 0x00.

As shown in Table 3, the figure may be subjected to screen processing with the high number of lines instead of the low number of lines. That is, the figure may be set as a character-family object, not an image-family object. In this case, drawing command replacement is performed so that the object information of a region of the corresponding figure is subjected to screen processing with the high number of lines.

FIG. 9A shows an example of drawing command replacement of obtaining the object information with the high number of lines according to the drawing command of the figure (fill). This time too overprint setting can be used. Accordingly, when the corresponding character is formed, the object information (spot color plate) that enables screen processing with the high number of lines using the character emphasizing screen 42 can be obtained.

FIG. 9B shows an example of drawing command replacement of drawing the image formed according to the drawing command on the process plate and the object information on the spot color plate simultaneously. Here, when the process plate and the spot color plate can be designated simultaneously, as in a color space, the color space is set by using "Device N".

In response to the drawing command of the character-family object such as character (show) and line (stroke), the object information (for example, 0xFF) is generated so as to perform screen processing with the high number of lines.

FIG. 10A shows an example of the drawing command for forming characters as the character-family object. By using, for example, overprint setting to such drawing command, drawing command replacement as shown in FIG. 10 B is performed.

This enables obtaining object information for performing screen processing with the high number of lines of character information (character string) to be drawn.

FIG. 11 shows the drawing command (image) as an example of the image-family object such as photographic image that is subjected to screen processing with the low number of lines.

For drawing command replacement of such a drawing command, as shown in FIG. 12A, overprint setting and transfer function can be used (also refer to FIG. 8A). When overprint is set for the object to be drawn, as shown be FIG. 12B, drawing command replacement of turning overprint setting off should be used (also refer to FIG. 8B).

This enables forming the spot color plate for obtaining object information for performing screen processing with the low number of lines of the image object.

There is colored (not white) recording paper (printing paper) used for machine plate printing. In a printing simulation of performing printing by the use of such printing paper, a paper color simulation may be run.

When such a paper color simulation is performed, a non-image region is drawn in paper color and a white object is drawn in a color similar to the paper color. At this time, on the spot color plate, with respect to the non-image region, the object information (0x00) is generated so as to perform screen processing with the low number of lines.

In such a paper color simulation, for example, when an unnecessary object is erased by a white figure, an inner side of a text frame is set to white, and the text frame is white, the object information (0xFF) is generated so as to perform screen processing with the high number of lines.

Figure 13A:
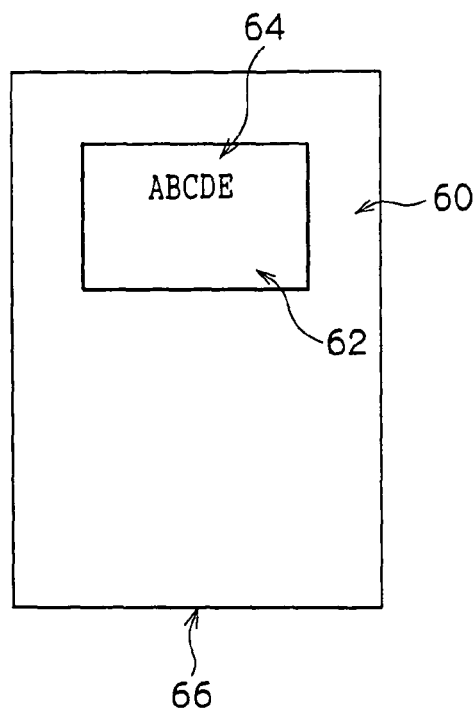
FIG. 13A is a schematic view of an example of an image in which a character string is formed within a white text frame.

FIG. 13A shows an image 66 formed by setting to draw a text frame 62 within an non-image region 60 in white and following the drawing command for drawing a character string 64 within the text frame 64.

Figure 13B:
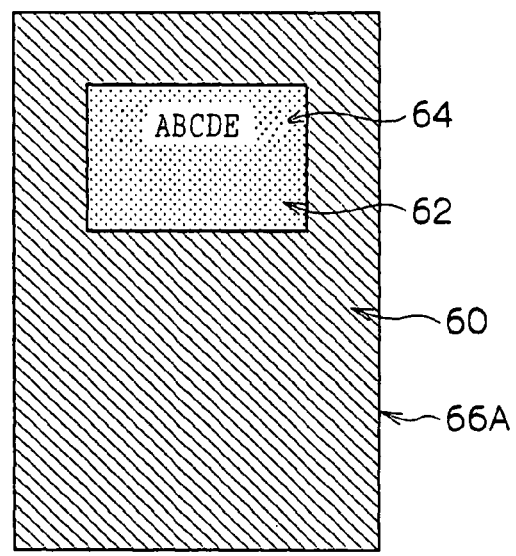
FIG. 13B is a schematic view of an example of an image in which an image subjected to paper color simulation and screen processing in response to a drawing command of the image shown in FIG. 13A.

In response to the drawing command for forming the image 66, paper color print simulation and screen processing in the photo/character mode are set. At this time, although the object information (0x00) of drawing the non-image region 60 in paper color is set so as to perform screen processing with the low number of lines, the object information (0xFF) within the text frame 62 is set so as to perform screen processing with the high number of lines. For this reason, as shown in FIG. 13B, an image 66A in color similar to paper color is formed where the inner side of the text frame 62 is not colored in paper color.

Therefore, as processing in the drawing command replacing part 48, in response to the drawing command set to make the drawing in white, drawing command replacement is executed so as to generate the object information (0x00) for performing screen processing with the low number of lines.

Figure 13C:
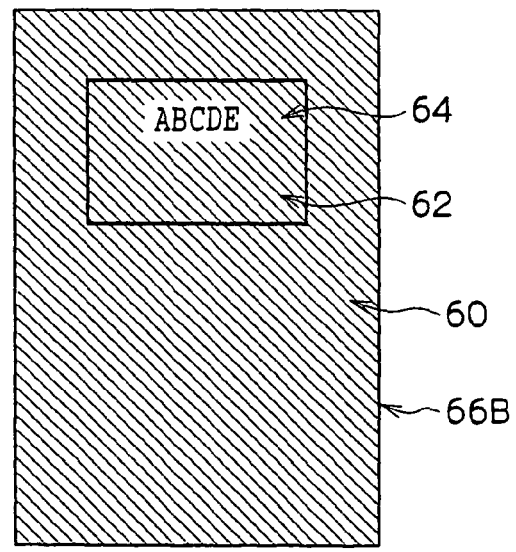
FIG. 13C is a schematic view of an example, in which the image that is subjected to paper color simulation and drawing in white in response to a drawing command of the image shown in FIG. 13A is subjected to screen processing with the low number of lines.

Accordingly, as shown in FIG. 13C, since the inner side of the text frame 62 drawn in white is set for screen processing with the low number of lines when paper color simulation is performed, an image 66B of a proper printing simulation can be formed. This is by preventing a difference between the inner side of the text frame 62 and the non-image region 60 in color from occurring.

When the photo/character mode, of combining the photo mode with screen processing with the low number of lines with the character mode of performing screen processing with the high number of lines, is selected as the screen mode in the print server 12, the spot color plate is generated. Together with this drawing command replacement is performed, drawing the object information that represents whether each object is processed with the low number of lines or the high number of lines.

Accordingly, since the image-family object is subjected to screen processing emphasizing gradation-level with the low number of lines and the character-family object is subjected to screen processing emphasizing character with the high number of lines, an image of high quality can be formed.

The print server 12 may perform the above-mentioned processing by using software.

Therefore, with a simple operation of introducing a program that forms the drawing command replacing part 48, a print server capable of generating the spot color plate can form an image of high quality by performing proper screen processing for each object without adding new hardware.

In this embodiment as described above, the image processing part 28 of the print server 12 is provided with the drawing command replacing part 48 so that setting of generation of the spot color plate formed by the object information and drawing command replacement can be performed. However, the invention is not limited to this configuration.

Figure 14:
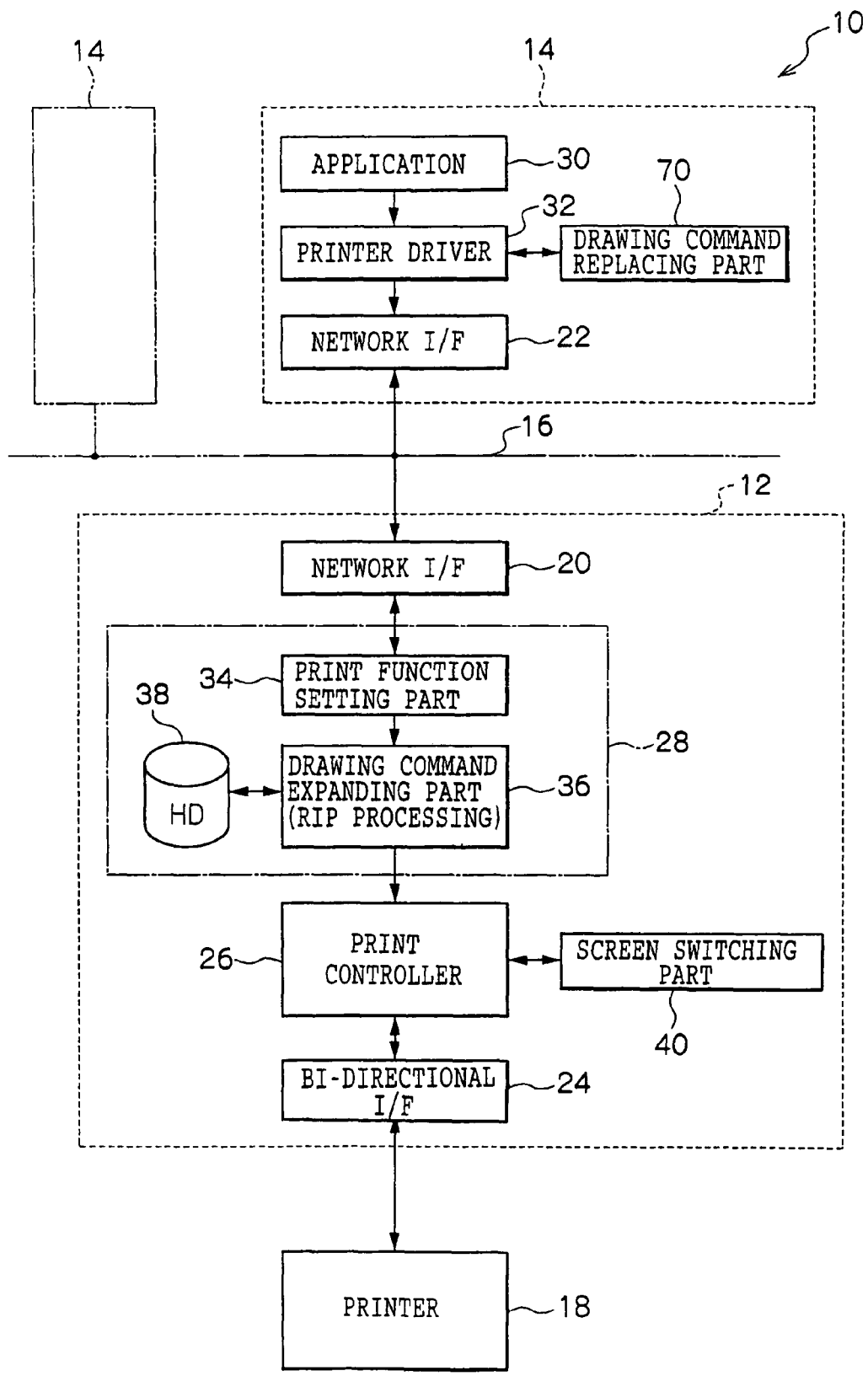
FIG. 14 is a schematic configuration view of a print server and client terminals showing another configuration of the first embodiment of the invention.

For example, the drawing command replacing part 48 may be provided as a function of the print driver 32 of the client terminal 14. That is, as shown in FIG. 14, a drawing command replacing part 70 instead of the drawing command replacing part 48 of the print server 12 may be provided in the client terminal 14.

Accordingly, by switching between the character emphasizing screen 42 and gradation-level emphasizing screen 44 for each object or pixel with respect to each color plate C, M, Y and K based on the object information of the spot color plate, an image of high quality can be formed.

Although the object information is generated for one object formed by the process colors C, M, Y and K in this embodiment, the object information may be generated for each of the C, M, Y and K objects.

Although two types of object information of the screen with the high number of lines (0xFF) and the screen with the low number of lines (0x00) is used in this embodiment, the invention is not limited to this. It is also acceptable that the object information of an intermediate number of lines between the high number of lines and the low number of lines is generated as an arbitrary value (for example, 0xA0) and screen is switched for each object of character, photo and figure. Further, arbitrary allocations of data may be made, for example, by allocating 0x00 to the screen with the high number of lines and 0xFF to the screen with the low number of lines and the like.

Although screen processing is performed according to character emphasis or gradation-level emphasis in this embodiment, the number of lines may be set according to character emphasis, line emphasis or gradation-level emphasis. Alternatively, screen processing and object information may be set so as to perform processing according to line weight, character size or character weight.

Although the screen is switched based on the object information in this embodiment, color correction processing or filter processing may be switched based on the object information. Alternatively, it is possible that object information that combines the processing is generated and screen processing, color correction processing or filter processing are switched based on the object information.

Also, when this invention is used with high density image RIP processing, (for example, 1200 dpi), then the TAG information obtained at this time can be used for making a standard printer image definition (for example 600 dpi) at the time of output.

Second Embodiment

Next, the following is a description of a second embodiment of the invention, in which, as an example, color correction processing, is carried out on image type objects such as photographic images taken by digital cameras and read in photographic images from scanners, film scans and the like (referred to below as photographic images). In other words, the second embodiment enables object information to be generated for each type of photographic image, and the obtaining of appropriate contrast, color balance and the like by carrying out color correction based on the generated object information.

Here, the fundamental configuration of the second embodiment is the same as the first, and where parts of the second embodiment are the same as elements of the first embodiment the same reference numbers will be used in the explanation.

Figure 15:
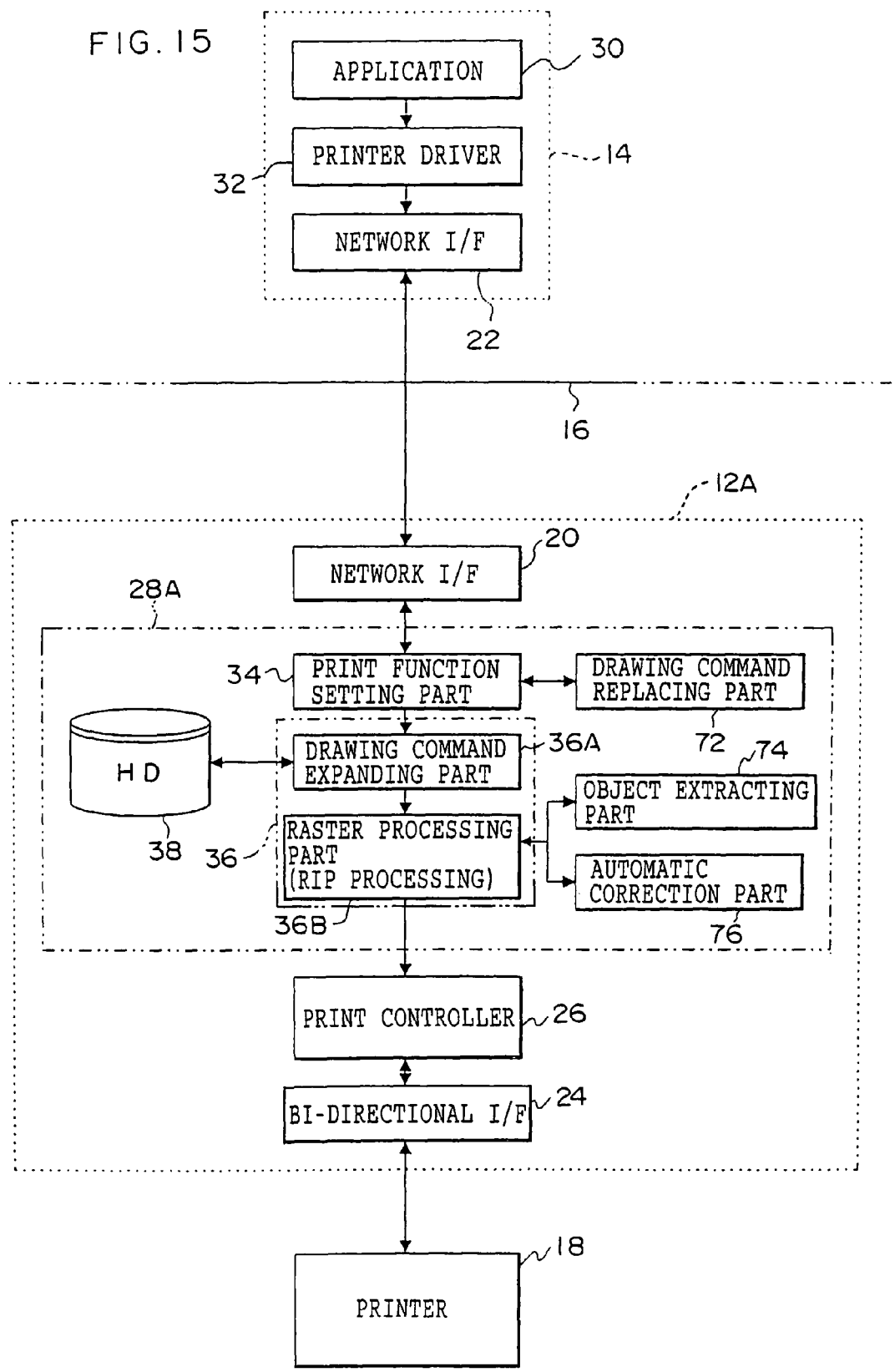
FIG. 15 is a schematic configuration view showing a print server and client terminal in accordance with a second embodiment of the invention.

FIG. 15 shows a schematic configuration of a print server 12A according to the second embodiment. This print server 12A is provided with a drawing command replacing part 72 in place of the drawing command replacing part 48.

Since in many cases the photographic image data is of RGB type, rather than CMYK type, in the drawing command replacing part 72, by for example the print function setting, when the RGB color correction setting is selected, the photographic images (image objects) are extracted, and drawing command replacement is carried out so that each extracted photographic image is subject to color correction.

According to this, in the drawing command expanding part 36 the drawing command is expanded, and, based on the expanded drawing command, RIP processing is carried out.

In the print server 12A the drawing command expanding part 36 is divided up and annotated with a drawing command expanding part 36A, where drawing command expansion is carried out, and a raster processing part 36B, where rasterizing (RIP processing) is undertaken according to the expanded drawing command. Or the setting of the RGB color correction can be carried out by, for example, using the printer driver 32 within the client terminal 14.

In the drawing command replacing part 72, in the same way as in the drawing command replacing part 48, a drawing command is created to generate a plate of color different from the C, M, Y, K process colors (a spot color plate). In other words, as shown in FIG. 3, in pint server 12A, the drawing command replacing part 72 undertakes specific replacement processing to the drawing command, and in the drawing command expanding part 36A, by expansion processing carried out based on the replaced drawing command a spot color plate (TAG) is generated in addition to each of the C, M, Y, K plates.

Also, as shown in FIG. 15, in the image processing part 28A of the print server 12A there is provided an object extraction part 74 and an automatic correction part 76. In the object extraction part 74, photographic images are extracted when rasterizing processing is carried out according to the drawing command, which was expanded in the drawing command expansion part 36A.

The spot color plate is generated based on the extracted photographic images in the raster processing part 36B. Here, the spot color plate is generated so that the same information is assigned to each of the pixels forming a single photographic image.

Also, in the automatic correcting part 76, automatic color correcting is carried out on the pixels of each of the C, M, Y and K color plates, by using the generated spot color plate as object information (TAG information). Here, uniform correction processing of the whole of the image region is carried out for each photographic image, by the same object information being assigned to pixels of the same image. This photographic image extraction and color correction on the extracted photographic image can be carried out by any known method, and hence details are not included in this explanation.

Now, how the processing carried out in the second embodiment of the invention will be explained.

In the client terminals 14 page layouts are formed, using applications 30 and the like. Here, the client terminals 14 can form page layouts which have multiple photographic images pasted on. Also, when the page layout is output for printing, setting using the print settings in the driver function 32 is carried out, a print job such as a page layout is formed and this print job is sent to the print server 12A.

The print server 12A receives the print job sent from the client server 14 and carries out reading of the print function and setting. After this, in the print server 12A, based on the settings of the print function, image processing, RIP processing is carried out, generating the raster data of each of the colors C, M, Y, K, and this raster data is output to the printer 18. In so doing, a print output based on the print job is obtained.

When RGB color correction is set in the print function for a print job including photographic images, in print server 12A, automatic color correction is carried out.

Figure 16:
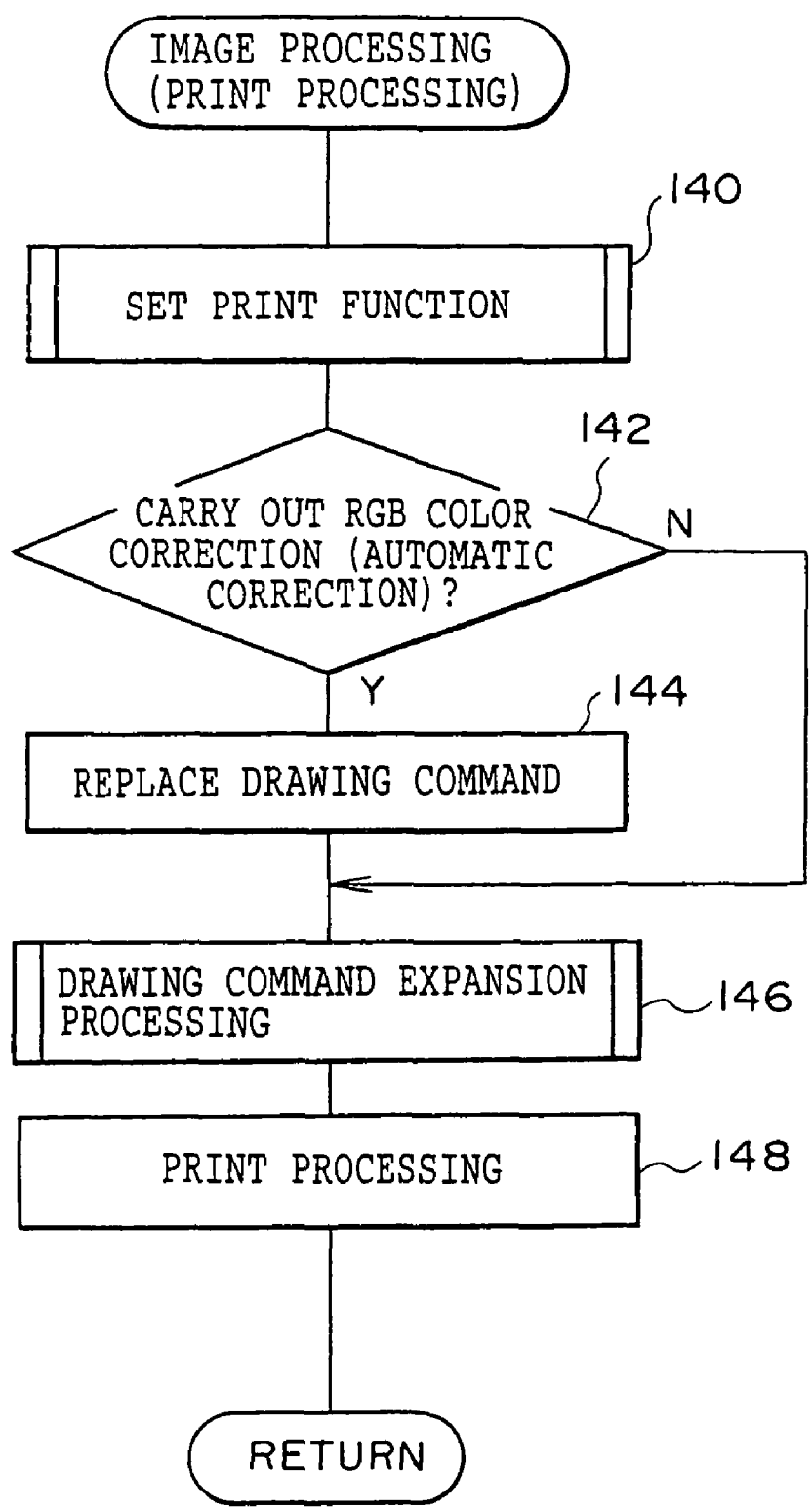
FIG. 16 is a schematic diagram of a process flow for the image processing that occurs when color correction processing is undertaken.

FIG. 16 shows a process flow at such a time. This flow chart is initiated, for example, when a print job is received, and in the first step 140, the print function setting is carried out. After this, in step 142, it is determined whether RGB automatic correction is to be carried out or not, in other words, whether in the print function RGB color correction is selected.

Here, if RGB color correction is set, when RGB automatic correction to be carried out, the determination in step 142 becomes affirmative, and the process proceeds to step 144 where drawing command replacement is carried out. Below the drawing command will be, as an example, written in PostScript language and comments (on the content) will be appended at "%".

When the drawing command is replaced, first, for example, the drawing command shown in FIG. 7A is added. By doing this, in addition to each of the C, M, Y, and K color plates, a spot color plate is generated.

After this, for example, for a photographic image (Image), when there is a drawing command such as the one shown in FIG. 17A, a drawing command is added so that drawing of a spot color plate is carried out, as set out below "image" in FIG. 17B. By this, a drawing command that will also undertake the drawing of a spot color plate, can be formed.

As stated above, generally the spot color plate is drawn as a knockout for each of the C, M, Y, and K color plates. Because of this, so that each of the C, M, Y, and K objects drawn are not erased by the spot color plate, overprint is set when the spot color plate is drawn.

Also it is suitable that, when setting a processing system using a LUT only effective with a spot color plate, even when the input value is "0" a LUT is selected which replaces this with a set value, and the spot color plate can be drawn accordingly.

In this way, drawing command replacement can be undertaken and, in the flow chart on FIG. 16, the process proceeds to step 146 and expanding processing of the drawing command is performed, raster processing (RIP processing) is carried out. After that, based on the output of the generated raster data to the printer 18, print processing is performed (step 148).

Figure 18:
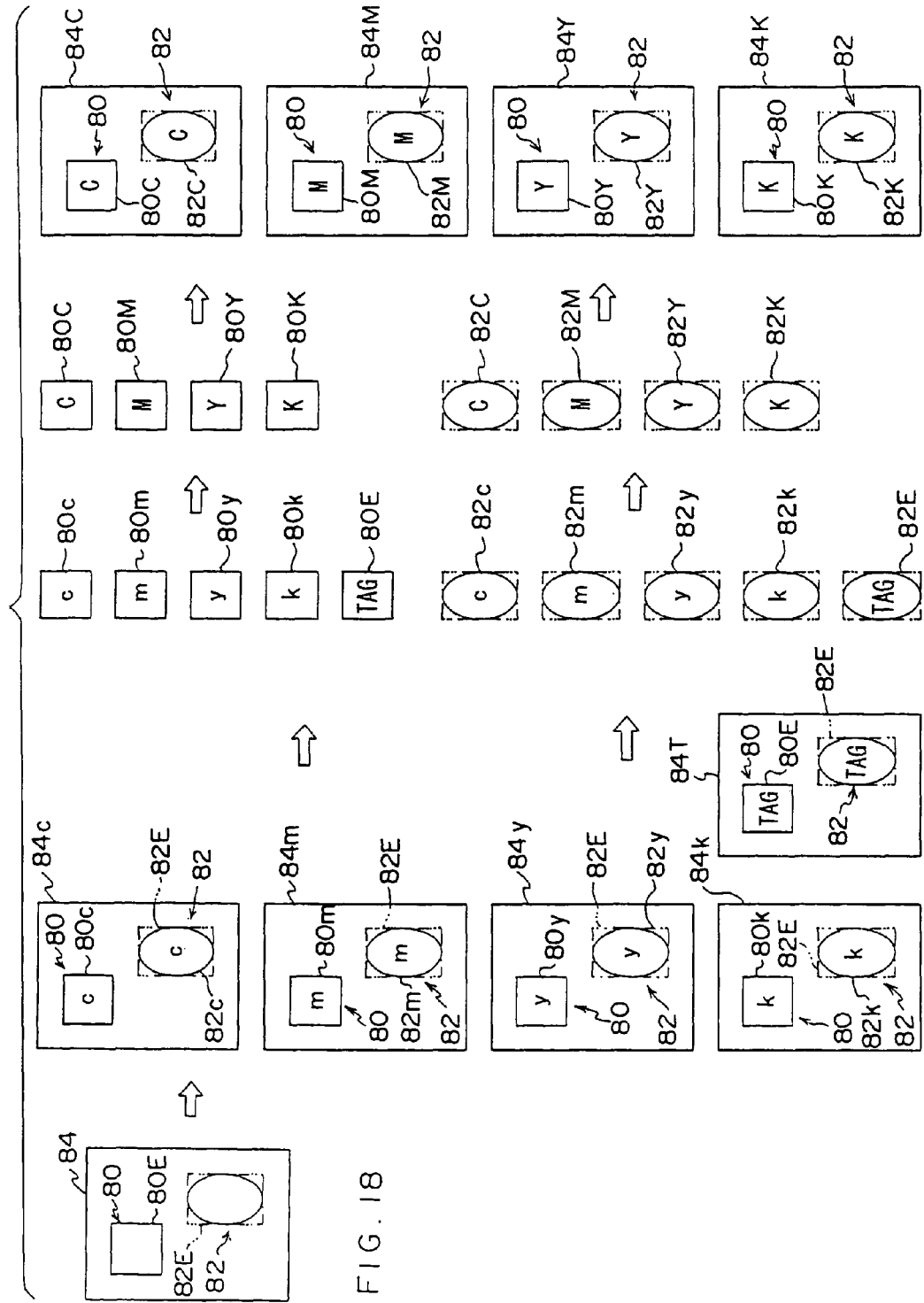
FIG. 18 is a schematic view of the process flow of rasterizing or color correction processing according to a replaced drawing command.

The expansion processing and the RIP processing of step 146 will be explained now. FIG. 18 shows, as an example, a process flow using a page layout 84 (image data for one page) formed from the photographic images 80 and 82 (image data).

In the print server 12A, the RGB correction is set for the image layout 84, and according to what is set in the drawing of the spot color plate, first, the plates 84c, 84m, 84y, 84k of each of the respective colors C, M, Y, and K, together with the raster data of the spot color plate 84T are generated. The raster data is 8 bits per pixel, enabling the expression of 256 different gradation-levels of each of the colors C, M, Y, and K.

The raster data of the color plates 84c, 84m, 84y, and 84k includes the decomposed images of the two photographic images 80 and 82 (images 80c, 80m, 80y, 80k and images 82c, 82m, 82y, 82k).

FIGS. 17A and 17B show in PostScript format drawing commands for the rectangular regions (referred to below as drawing regions 80E and 82E) of width (Width), height (Height) and drawing position (ImageMatrix).

The spot color plate 84T is drawn in the rectangular drawing regions 80E and 82E with the extraction of the photographic images 80 and 82. Here the extraction for the rectangular regions does not need to be undertaken at the time of drawing, and, for example, for the raster data after drawing any known method for extracting the rectangular regions can be used.

FIGS. 19A to 19D show the drawing of the spot color plate 84T. Here, 8 bit raster data is used for drawing, values can be drawn for non image portions of "00", and image portions (photographic image) portions with values in the range between "01" and "FF".

In print server 12A, for a single photographic image the same value is written. When there are several photographic images, then the same fixed value (for example "FF") can be used for all of the photographic images.

FIGS. 19A and 19C show the spot color plates 84Ta and 84Tb which have been drawn using a fixed value "FF" in the regions 80E and 82E corresponding to the photographic images 80 and 82. As long as the drawn regions 80E and 82E do not overlap then color correction processing for the each photographic images 80 and 82 can be performed separately, even when the same fixed value is drawn in this way. However, as shown in FIG. 19C, if the photographic images 80 and 82 overlap then they form one region (rectangular region) and separate color correction processing of each image becomes impossible.

However, the value drawn also can be changed between the photographic images 80 and 82. FIGS. 19B and 19D show spot color plates 84Tb and 84Td which have had the value drawn changed between the photographic images 80 and 82. Here an example of drawing, in which the value drawn for the photographic image 80 is "01" and the value drawn for the photographic image 82 is "02", is shown.

In this way, by changing the value drawn for each of the photographic images, it becomes possible for color correction to be carried out which is set for each of the photographic images. When the photographic images overlap, the value of the top photographic image (the photographic image 82 in FIG. 19D) is drawn, and by changing the value drawn for each of the photographic images, as shown in FIG. 19D, it is possible to carry out correction according to the same correction conditions over the whole of the area of the photographic image 82.

Here, when the value drawn for each of the photographic images is changed then, any method can be used. For example, the values can be changed in, say, the order of extraction to "01", "02", "03", . . . , "FF".

As is shown in FIG. 18, the color plates 84c, 84m, 84y and 84k together with the spot color plate 84T are generated, and to match the drawing areas 80E and 82E drawn on the spot color plate 84T, the photographic images 80c, 80m, 80y, 80k and photographic images 82c, 82m, 82y, and 82k are extracted.

Then, for the photographic images 80c, 80m, 80y, 80k and photographic images 82c, 82m, 82y, and 82k color correction processing is carried out to form the corrected photographic images 80C, 80M, 80Y, 80K and photographic images 82C, 82M, 82Y, and 82K.

Next, by pasting the photographic images 80C, 80M, 80Y, and 80K and photographic images 82C, 82M, 82Y, and 82K onto the original color plates 84c, 84m, 84y and 84k, color plates which have undergone color correction 84C, 84M, 84Y and 84K can be obtained.

In this way, by using a spot color plate which is different from the process colors, TAG information can be formed for each photographic image, and by carrying out color correction based on this TAG information, appropriate color correction processing can be carried out. This is even in conditions when, in the application 30, a single photographic image is divided up into several portions, and sent from a client terminal 14, and without the need to determine whether the data is from the same photographic image or not.

For example, as shown in FIG. 20A, when the page layout 92 formed from the RGB image 90 is sent, application 30 sends the data for the RGB image 90 divided up into several strip like blocks (here, for example, blocks 90A, 90B, 90C, and 90D).

This type of image data is plate separated into each of the process color plates 92C, 92M, 92Y, and 92K and the spot color plate is formed (see FIG. 20B). Here, if the values set for the image data is different for each of the blocks 90A to 90D then, as is shown in FIG. 20C, the spot color plate 92Ta, in the image drawing region 90E, has data changed for each of the blocks 90A to 90D.

Here, a spot color plate 92T, such as the one shown in FIG. 20D, can be generated by forming the TAG information with the RGB image 90 treated as one image, for RGB image 90 inside the drawing region 90E the value becomes the same.

If color correction processing is carried out according to this spot color plate 92T, then appropriate color correction processing for the RGB image 90 can be performed.

Because the TAG information (spot color plate) is formed with the same value when the application sends the divided up image, color correction can be carried out that does not cause problems as the image is formed back into one image. When the TAG information value is changed, then the TAG information for each of the divided up blocks is changed, and the problem that color correction cannot be performed as for a single image occurs. However, even in this sort of situation, when the image region is extracted at the time of writing the TAG information, when the image contacts with the image which has just before been written, then a method can be applied, say, such that the value of the TAG information is not changed.

Even when within data for a single image (page layout) there are several photographic images, then appropriate color correction can be carried out, and the formation of high quality images becomes possible.

In this case, in the print server 12A a drawing command replacing part 72 is provided, so that according to the print settings drawing command replacement is carried out. However there is no limitation to this case, and it is also suitable that drawing command replacement is carried out according to the functions of the application 32 in the client terminal 14.

In other words, as shown in FIG. 21, it is also suitable that the client terminal 14 is provided with a drawing command replacing part 86, and when print setting is carried out using the printer driver 32, by the selection, for example, of RGB color correction, drawing command replacement can be carried out according to that which is drawn on the spot color plate 84T. By doing this the drawing command replacement function in the print server 12A (drawing command replacing part 72) becomes unnecessary, and as long as a function for drawing a spot color plate is included, it is possible to carry out appropriate color correction for each of the photographic images.

Although the invention as applied to the print server 12 and the printer 18 of the network 10 described in this embodiment, the invention is not limited to this. For example, the invention can be applied to an image processing apparatus of any configuration connected to the network.

The first embodiment of the invention, is an image processing method for performing image processing according to the type of object, when image data is entered from the image processing terminal or image processing is carried out based on the drawing command, where it is possible that, when the color plate data is formed for the process colors, a spot color plate different from the process colors is set, and object replacement is carried out to draw object information for the spot color plate for carrying out image processing for each of the objects according to the type of the object.

In this invention, it is possible that character emphasis or gradation-level emphasis are the object types, or it is also suitable that the types of the object include, as well as the previously mentioned types of object, character emphasis, line emphasis, gradation-level emphasis, to include line weight, character size, and character weight.

Also, in this invention, screen process as the image processing is possible, image processing which includes color correction processing or filter processing may also be used.

For example, when the image processing is screen processing, then it is possible to write two value object information, for screen processing with screen lines of high line number character emphasis (high screen frequency), or screen processing with screen lines of low line number gradation emphasis (low screen frequency).

When the invention is applied to color correction, the following is performed: extraction of the rectangular areas including the objects, setting the object information for each of the objects, setting the rectangular areas with the object information for each of the objects, carrying out color correction processing for each of the objects.

When a photographic image taken by a digital camera, for example, is extracted as an object, the rectangular area including that object is extracted, a spot color plate is generated with object information for this extracted region, and using this spot color plate color correction is carried out.

By doing so, even if the photographic data for a photographic image is divided up, appropriate color correction processing can be performed.

With this invention, as the object information, for each of the extracted regions previously set data can be written in. Also, for this invention, it is possible as object information to write in a different value for each of the objects, or write in previously set values in sequence as the objects are extracted in sequence.

In this invention, it is possible to undertake drawing command replacement such that overprinting of the object occurs. Here, after the drawing of the object information on the spot color plate, at the time of drawing the object on the process color plates, drawing command replacement can be carried out so that the object is overprinted. Alternatively, after drawing the object on the process color plate, when the object information is drawn on the spot color plate drawing command replacement can be carried out so that the object is overprinted.

Also in this invention, drawing command replacement can be carried out where the object information is drawn on the spot color plate using a transfer function.

In addition, in this invention, drawing command replacement can be carried out so that for the setting of the drawing command for overprinting of an object, the object can be drawn on the process color plate with overprint off and the object drawn as a knock out.

Also, in this invention, for a drawing command to draw an object in white, drawing command replacement can be carried out so that inverse object information based on the drawing command is formed.

The second embodiment of the invention is a image processing device which, when image processing is being carried out according to drawing commands entered from an image processing terminal, undertakes image processing depending on the type of the object. When the data of the process color plates are being made according to the drawing command, drawing of a spot color plate different to the process color plates is set. Drawing command replacement is carried out by a drawing command replacing part the spot color plate is drawn with data of object information which sets the object processing to be carried out for each image according to the image type. Also included is a drawing command expanding part which undertakes expanding processing, of the drawing command replaced in the drawing command replacing part, and generates the process color plates and the spot color plate.

The type of object could be character emphasis or gradation-level emphasis, or the types of object could include, as well as character emphasis, line emphasis, and gradation-level emphasis, line weight, character size, and character weight.

Also, in the image processing apparatus of the invention an image processing switching part preferably is included which, when the image data for the process color plates expanded in the drawing command expanding part is output, outputs a switching signal for switching the processing for each of the objects according to the object information recorded on the spot color plate.

Also, in the invention, in the image processing terminal, when there is a setting component included for switching the image processing for each object, then it is suitable for the drawing command replacement to be carried out according to the setting of the setting component. Also, it is suitable to provide the drawing command replacing part in the image processing terminal.

In addition, in the image processing apparatus of the invention, it is suitable to have screen processing as the image processing, and the image processing can include color correction processing and/or filter processing.

Also, when color correction processing is carried out it is possible to include: an extraction component, for extracting rectangular regions including objects; a setting component, for setting object information for each of the objects; a region setting component, for setting the regions extracted by the extraction component on the spot color plate with the object information of each of the objects which was set by the setting component; a color correction component for carrying out color correction on the images of the extracted regions on the process color plates according to the object information set by the region setting component on the spot color plate.

Also, when color correction is carried out in the image processing apparatus, the region setting component can: write into each of the extracted regions predetermined data, as the object information; write in a different value of object information for each of the objects; or, write in a sequence predetermined values in the order of extraction.

What is claimed is:

1. An image processing method comprising:
inputting a first drawing command; and
replacing the first drawing command with a second drawing command,
wherein the second drawing command includes a first instruction to generate process color plates which represents information of process colors and to generate a spot color plate which represents information of a spot color when the second drawing command is expanded, and a second instruction to draw tag information, into the spot color plate, which represents object information and which does not represent the information of the spot color when the second drawing command is expanded,
wherein the tag information does not represent information of process colors, and
the object information is information indicating a type of object.

2. The image processing method according to claim 1, wherein the object information is information to set image processing in accordance with a type of an object, and
the image processing method further comprises executing the image processing of the object of the color plates of the process colors based on the tag information of the spot color.

3. The image processing method according to claim 2, wherein the type of the object includes at least one of line weight, character size or character weight in addition to character emphasis, line emphasis and gradation-level emphasis.

4. The image processing method according to claim 2, wherein the image processing is screen processing.

5. The image processing method according to claim 2, further comprising:
 extracting one or more rectangular regions including objects;
 setting the object information for each of the objects in the extracted rectangular regions; and
 performing color correction on each of the objects.

6. The image processing method according to claim 5, wherein data predetermined in advance for each of the extracted regions is written in as the object information.

7. The image processing method according to claim 6, wherein different data for each of the objects is written in as the object information.

8. The image processing method according to claim 6, wherein a sequence of values predetermined in advance is written in an order of object extraction.

9. The image processing method according to claim 2, wherein the image processing includes filter processing.

10. The image processing method according to claim 2, wherein the drawing command replacement is performed so as to overprint the object.

11. The image processing method according to claim 10, wherein the drawing command replacement is performed so as to overprint the object when the object is drawn on the color plates of the process colors after the object information is drawn on the spot color plate.

12. The image processing method according to claim 10, wherein the drawing command replacement is performed so as to overprint the object information when the object information is drawn on the spot color plate after the object is drawn on the color plates of the process colors.

13. The image processing method according to claim 10, wherein the drawing command replacement is performed by using a transfer function for drawing the object information on the spot color plate.

14. The image processing method according to claim 2, wherein the drawing command replacement is performed by turning off overprint and drawing the object as a knockout on the color plates of the process colors in response to the drawing command for setting overprint of the object.

15. The image processing method according to claim 2, wherein the drawing command replacement is performed so as to generate the object information that inverts the object information of the drawing command in response to the drawing command for drawing the object in white.

16. The image processing method according to claim 2, further comprising:
 setting a print job to perform photo-mode emphasizing gradation-levels or character mode emphasizing thin lines.

17. The image processing method according to claim 2, wherein when image data includes plural types of objects, replacing the first drawing command with the second drawing command.

18. The image processing method according to claim 17, wherein when the image data includes character emphasis type of object and gradation-level emphasis object, replacing the first drawing command with the second drawing command.

19. The image processing method according to claim 2, wherein the first drawing command is replaced with the second drawing command by using at least one of a transfer function, an overprint setting, and a knockout setting.

20. The image processing method according to claim 2, wherein the first drawing command is replaced with the second drawing command by extracting an object of the first drawing command, determining whether the object of the first drawing command is an image family object or a character family object, and then replacing the first drawing command based upon the determination of whether the object is an image family object or a character family object.

21. The image processing method according to claim 2, wherein when color correction processing is carried out, replacing the first drawing command with the second drawing command.

22. The image processing method according to claim 1, wherein the object information is code information indicating the type of object for each pixel.

23. An image processing apparatus comprising:
 a drawing command input part that inputs a first drawing command;
 a drawing command replacing part that replaces the first drawing command with a second drawing command; and
 a drawing command expanding part that expands the second drawing command,
 wherein the second drawing command includes a first instruction to generate process color plates which represents information of process colors and to generate a spot color plate which represents information of a spot color when the second drawing command is expanded by the drawing command expanding part, and a second instruction to draw tag information, into the spot color plate, which represents object information and which does not represent the information of the spot color when the second drawing command is expanded by the drawing command expanding part,
 wherein the tag information does not represent information of process colors, and
 the object information is information indicating a type of object.

24. The image processing apparatus according to claim 23, wherein the object information is information to set image processing in accordance with a type of an object, and
 wherein the drawing command expanding part executes the image processing of the object of the color plates of the process colors based on the tag information of the spot color.

25. The image processing apparatus according to claim 24, wherein the type of the object is character emphasis or gradation-level emphasis.

26. The image processing apparatus according to claim 24, wherein the type of the object includes at least line weight, character size or character weight in addition to character emphasis, line emphasis and gradation-level emphasis.

27. The image processing apparatus according to claim 24, further comprising an image processing switching part that outputs a switch signal for switching image processing for each object based on the object information of the spot color plate when image data of color plates of the process colors expanded in the drawing command expanding part is output.

28. The image processing apparatus according to claim 24, wherein when an image processing terminal includes a setting component for switching the image processing for each object, the drawing command replacing part performs drawing command replacement based on a setting of the setting component.

29. The image processing apparatus according to claim 24, wherein an image processing terminal is provided with the drawing command replacing part.

30. The image processing apparatus according to claim 24, wherein the image processing includes screen processing.

31. The image processing apparatus according to claim 24, wherein the image processing includes color correction processing.

32. The image processing apparatus according to claim 31, further comprising:
- an extracting component that extracts one or more rectangular regions including objects;
- an object information setting component that sets the object information for each object,
- a region setting component that sets the object information on the spot color plate, in the regions which have been extracted by the extracting component with a setting by the object information setting component;
- a color correction component that performs color correction on an image in the extracted region of the process color plates based on the object information on the spot color plate set by the region setting component.

33. The image processing apparatus according to claim 32, wherein the region setting component writes data predetermined in advance for each of the extracted regions as object information.

34. The image processing apparatus according to claim 33, wherein the region setting component writes different values for each of the objects as the object information.

35. The image processing apparatus according to claim 33, wherein the region setting component writes a sequence of values predetermined in advance in the order of object extraction.

36. The image processing apparatus according to claim 24, wherein the image processing includes filter processing.

37. The image processing apparatus according to claim 24, further comprising:
- a print mode setting interface for a user to select a print job to perform photo mode emphasizing gradation levels or character mode emphasizing thin lines.

38. The image processing apparatus according to claim 23, wherein the object information is code information indicating the type of object for each pixel.

39. An image processing system comprising:
- a drawing command input part that inputs a first drawing command;
- a drawing command replacing part that replaces the first drawing command with a second drawing command; and
- a drawing command expanding part that expands the second drawing command,
- wherein the second drawing command includes a first instruction to generate process color plates which represents information of process colors and to generate a spot color plate which represents information of a spot color when the second drawing command is expanded by the drawing command expanding part, and a second instruction to draw tag information, into the spot color plate, which represents object information and which does not represent the information of the spot color when the second drawing command is expanded by the drawing command expanding part,
- wherein the tag information does not represent information of process colors, and
- the object information is information indicating a type of object.

40. The image processing system according to claim 39, wherein the object information is information to set image processing in accordance with a type of the object, and
wherein the drawing command expanding part executes the image processing of the object of the color plates of the process colors based on the tag information of the spot color.

41. The image processing system according to claim 39, wherein the object information is code information indicating the type of object for each pixel.

* * * * *